INVENTORS
HERMAN R. FREUND
FRITZ STADELMANN
BY Curtis, Morris + Safford
ATTORNEYS

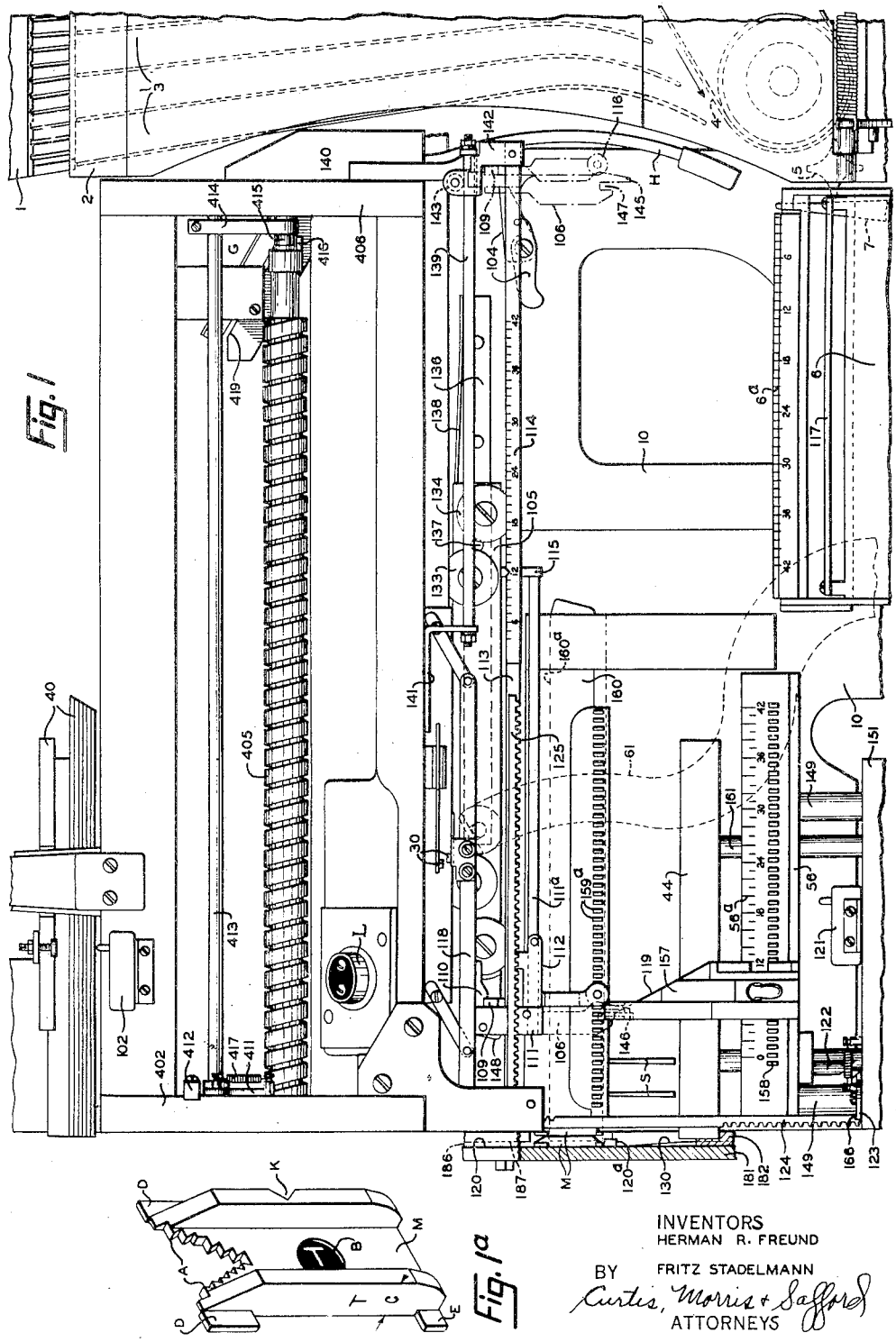

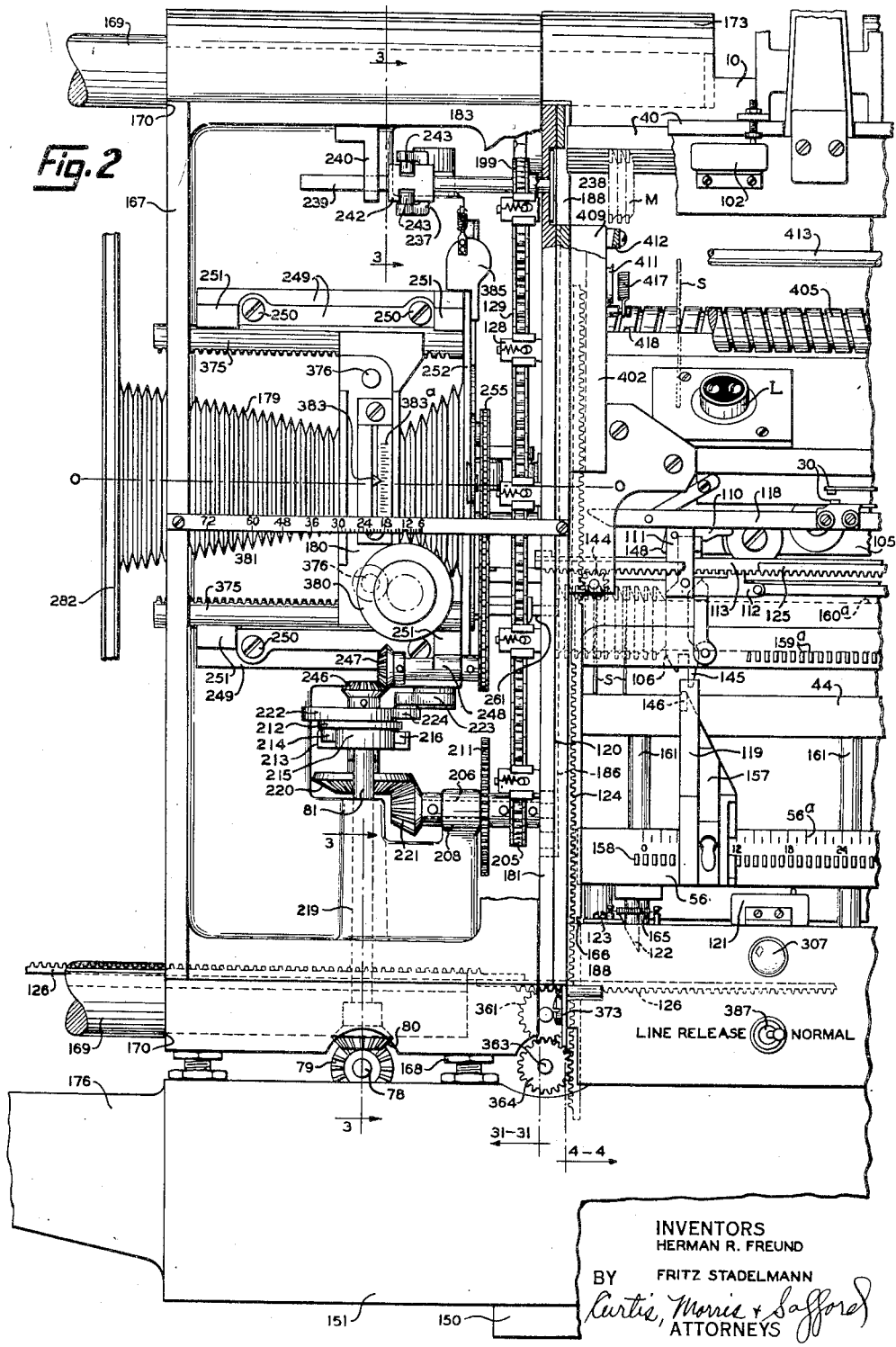

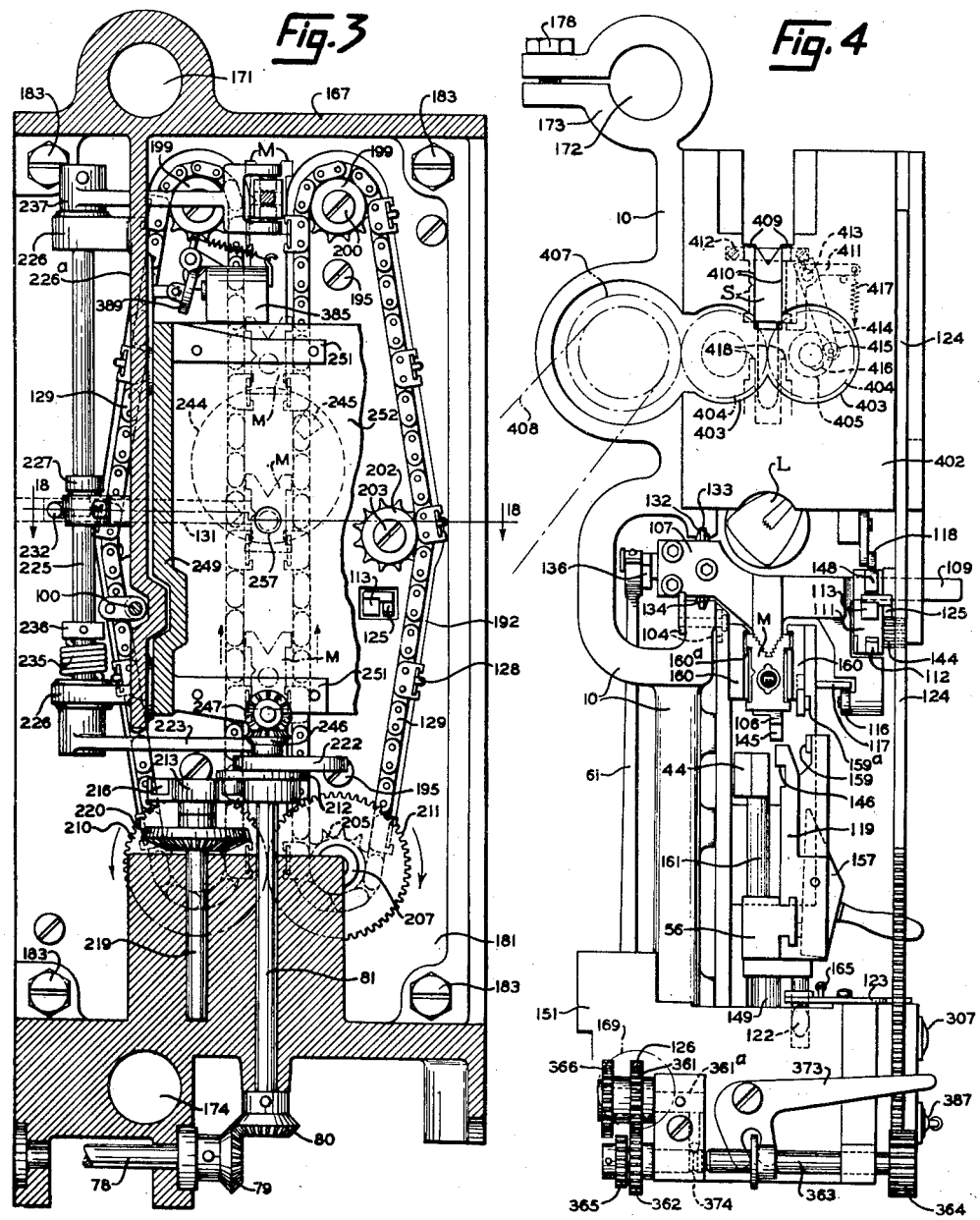

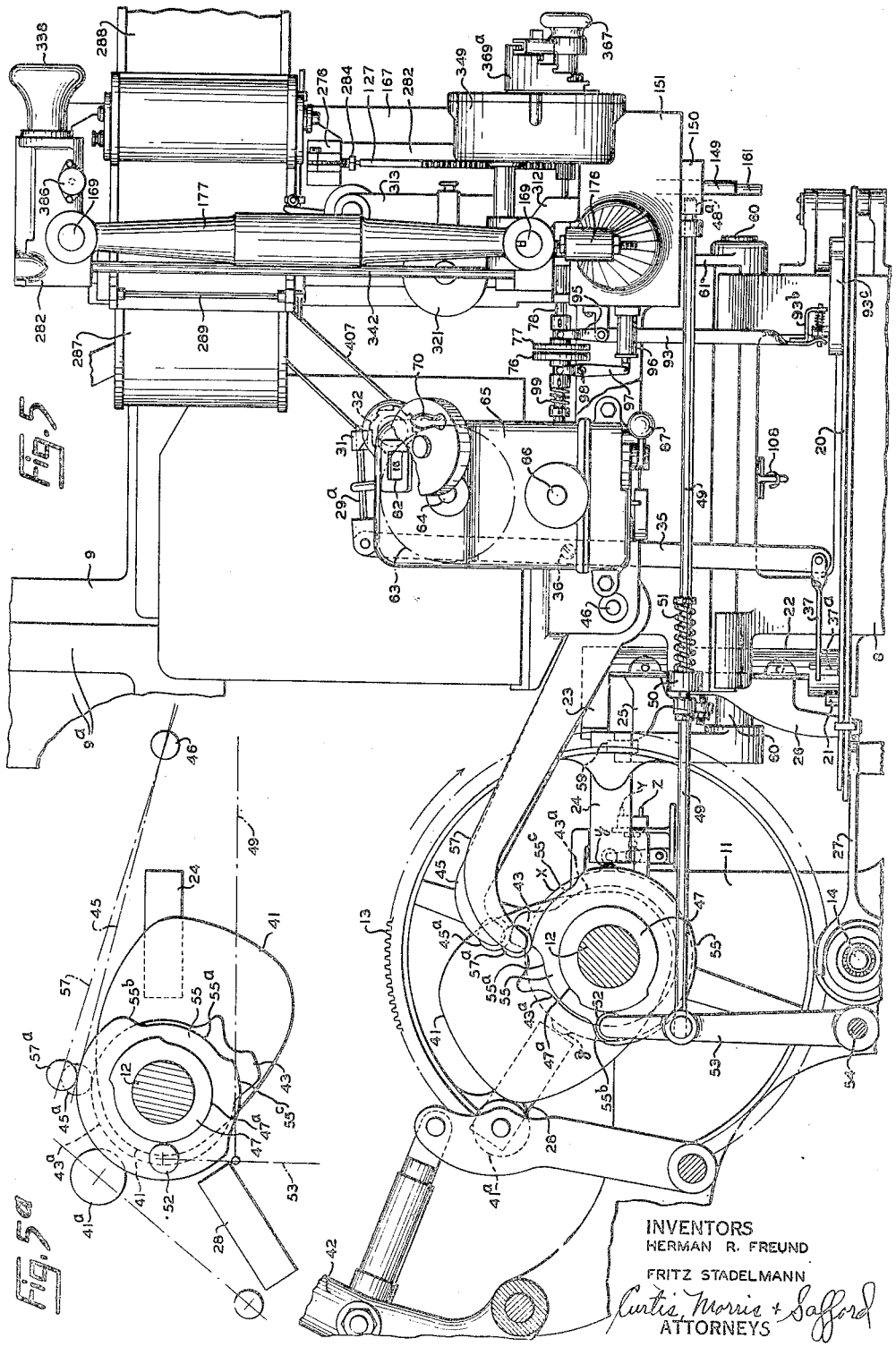

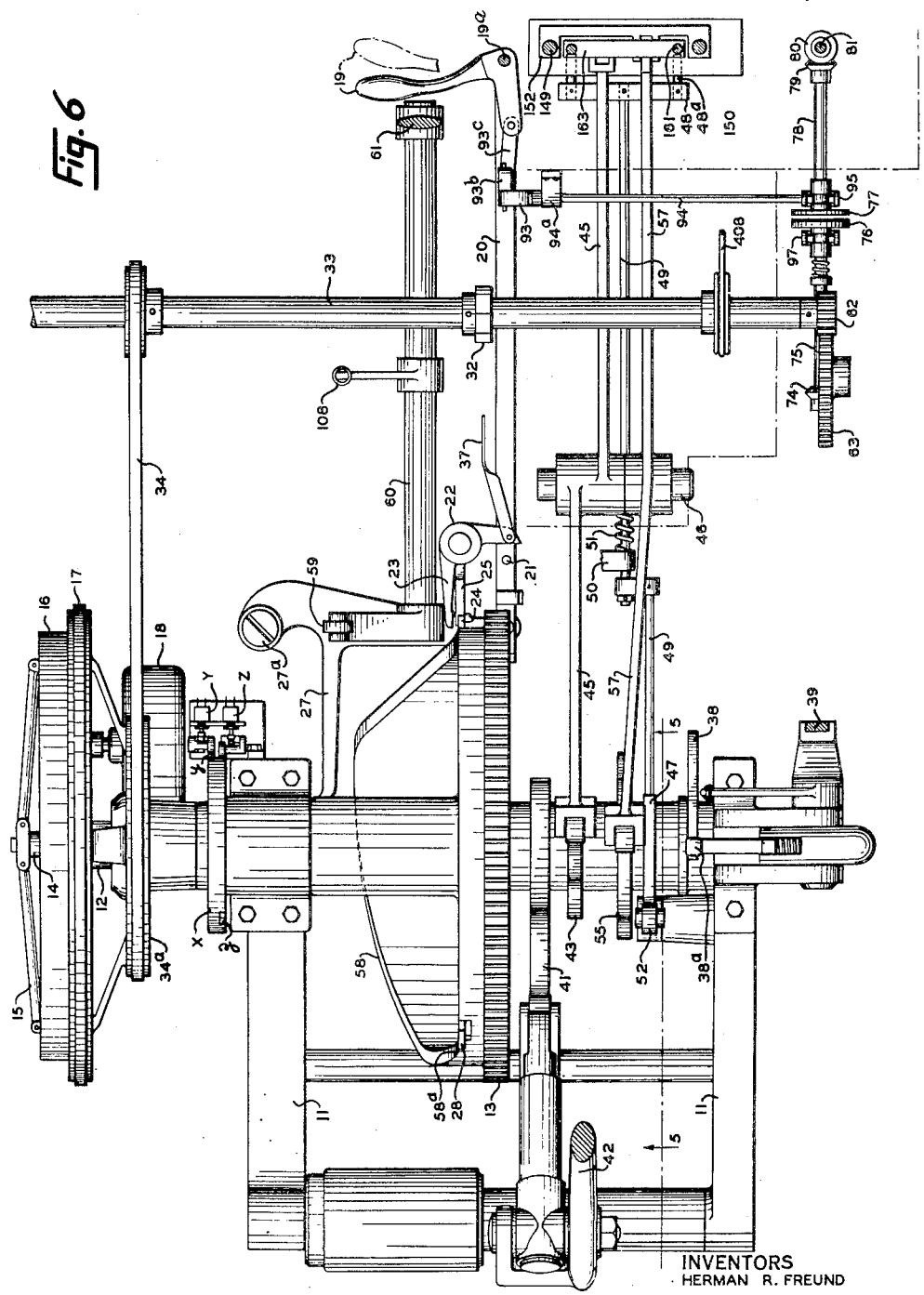

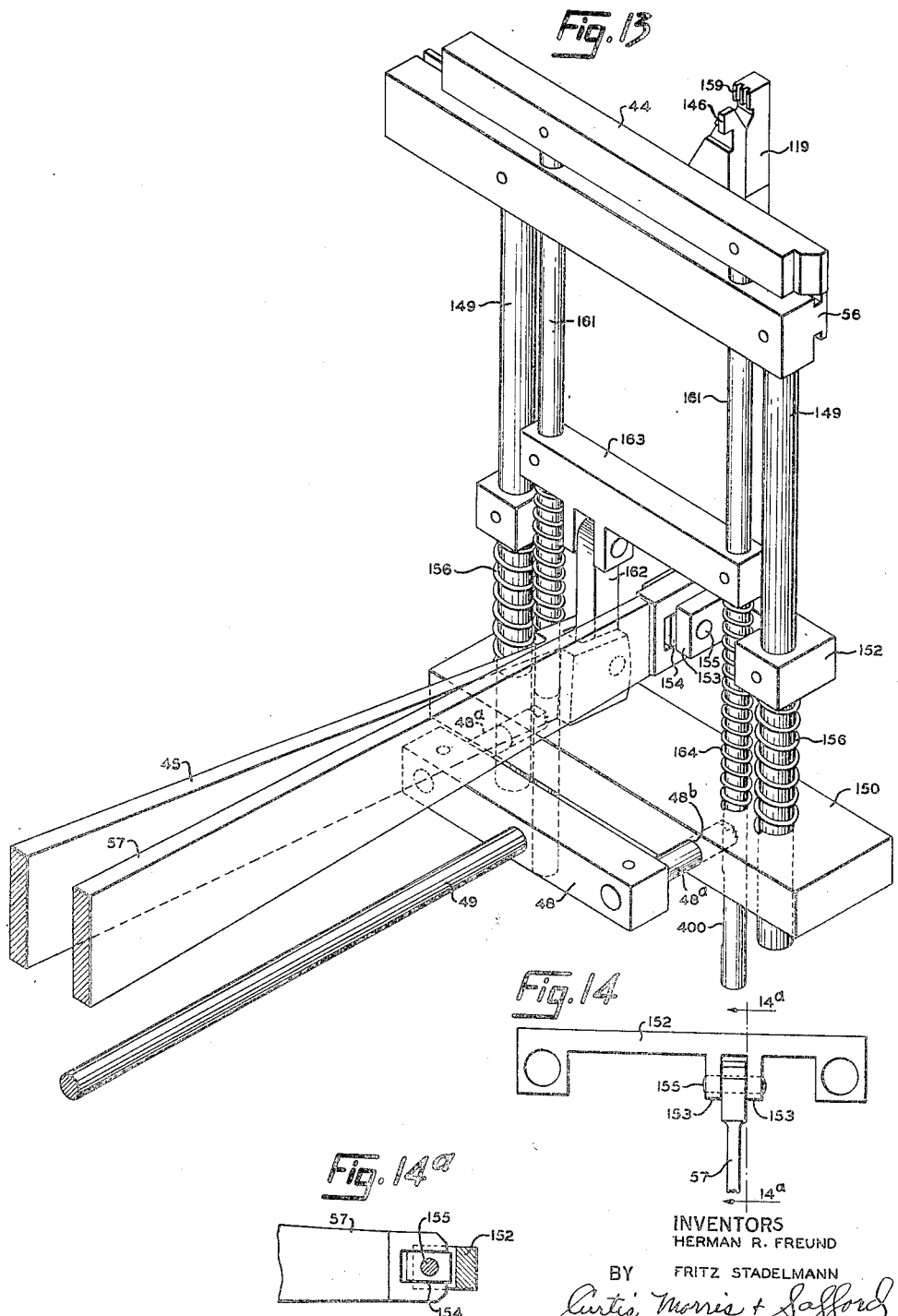

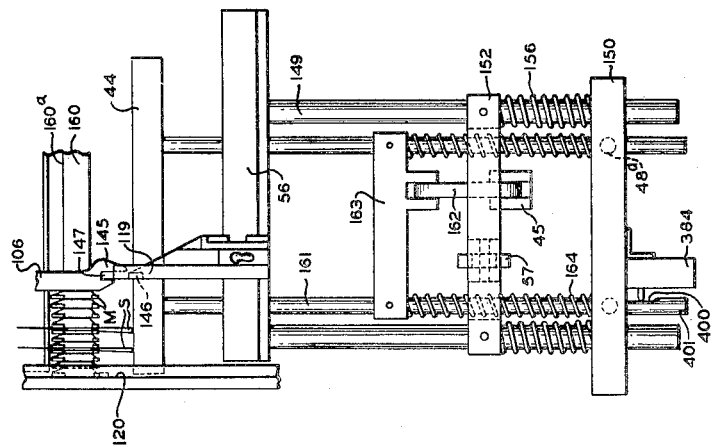

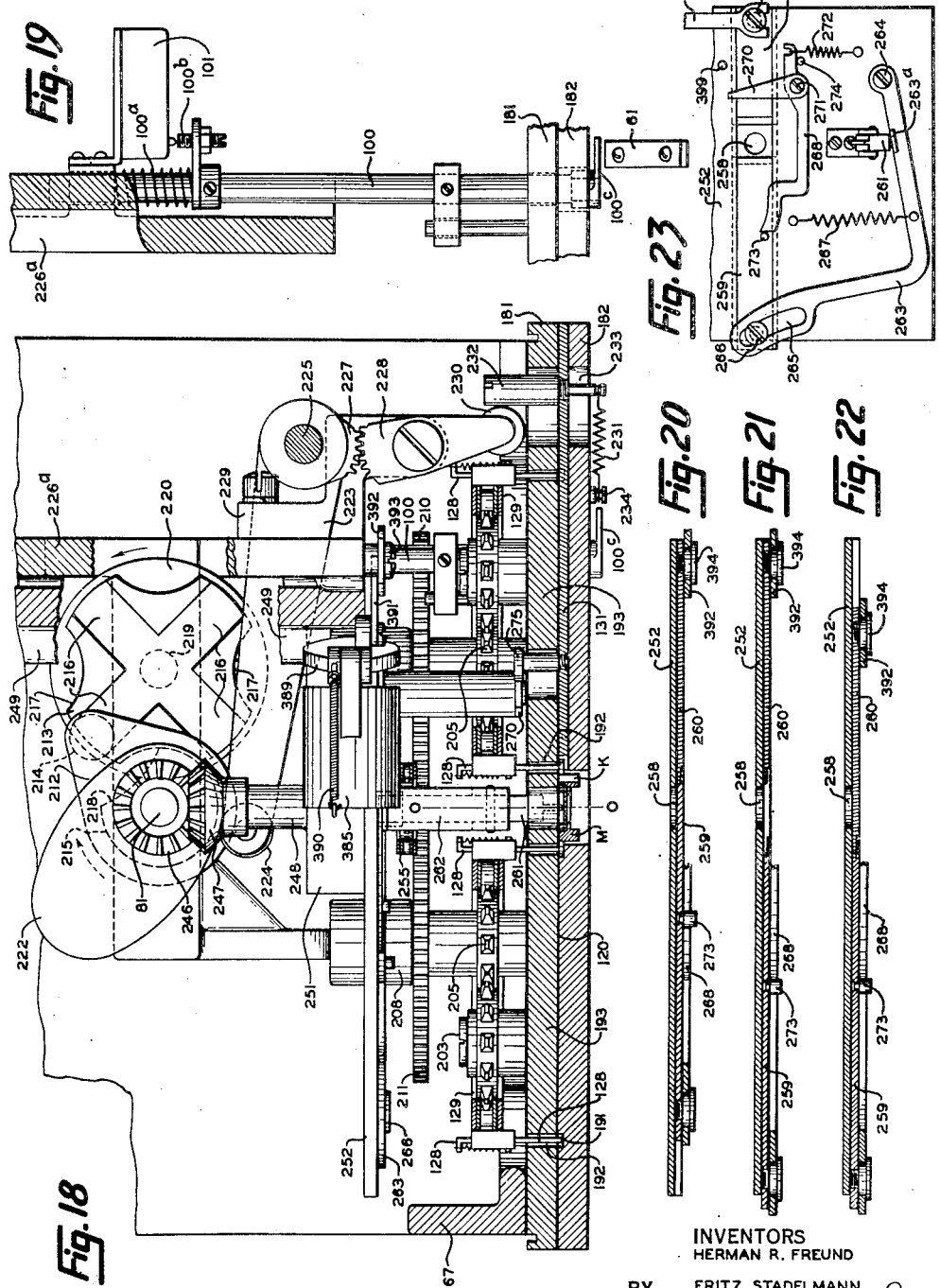

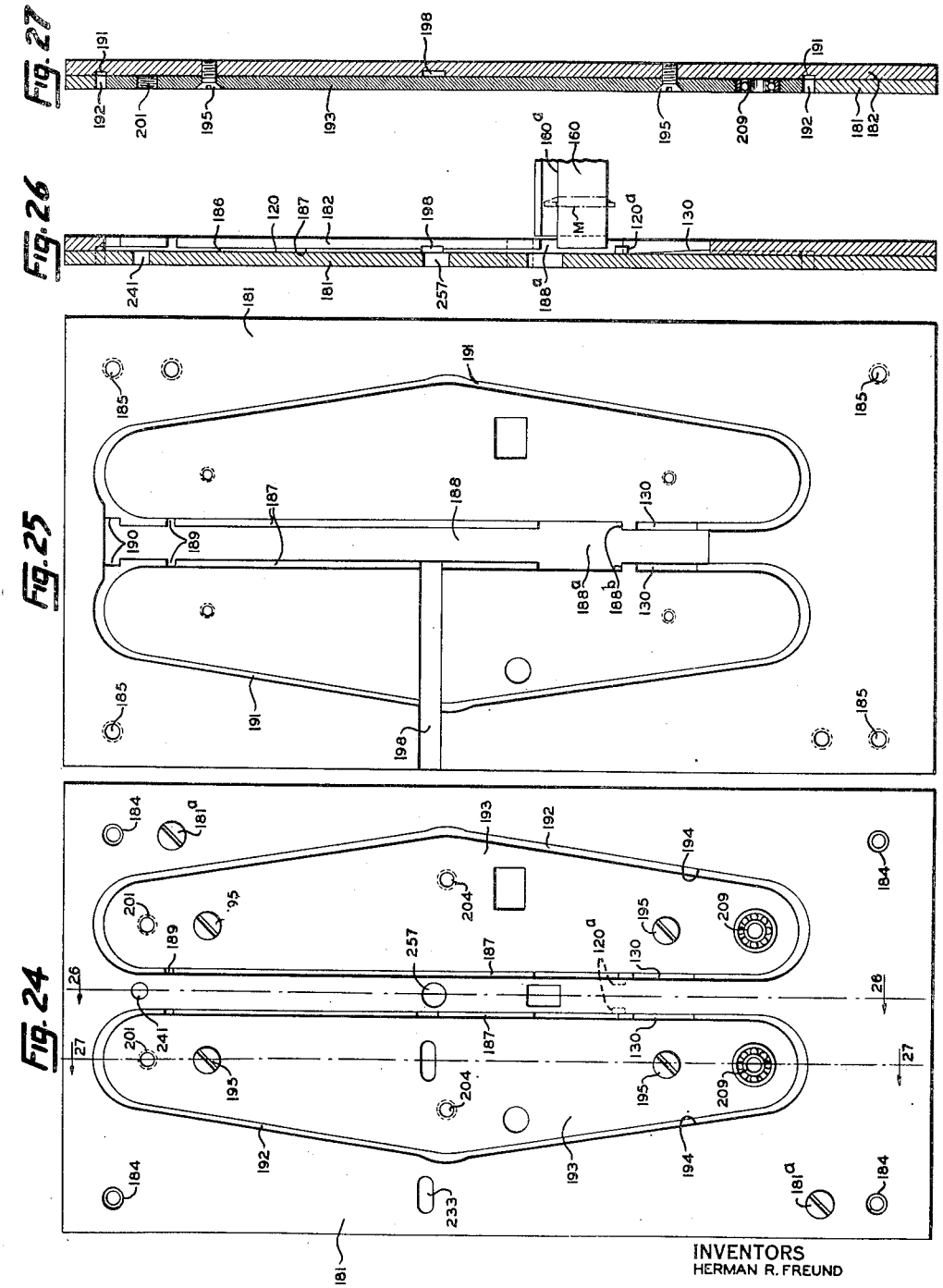

May 15, 1951     H. R. FREUND ET AL     2,552,881
PHOTOGRAPHIC TYPE COMPOSING MACHINE
Original Filed April 7, 1945     17 Sheets-Sheet 11
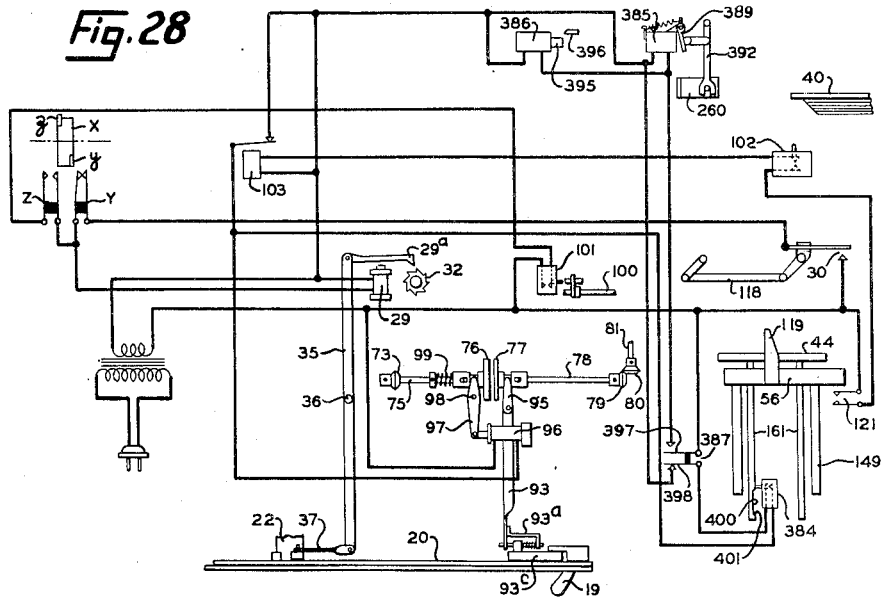
INVENTORS
HERMAN R. FREUND
FRITZ STADELMANN
BY Curtis, Morris & Safford
ATTORNEYS May 15, 1951 H. R. FREUND ET AL 2,552,881
PHOTOGRAPHIC TYPE COMPOSING MACHINE
Original Filed April 7, 1945 17 Sheets-Sheet 12
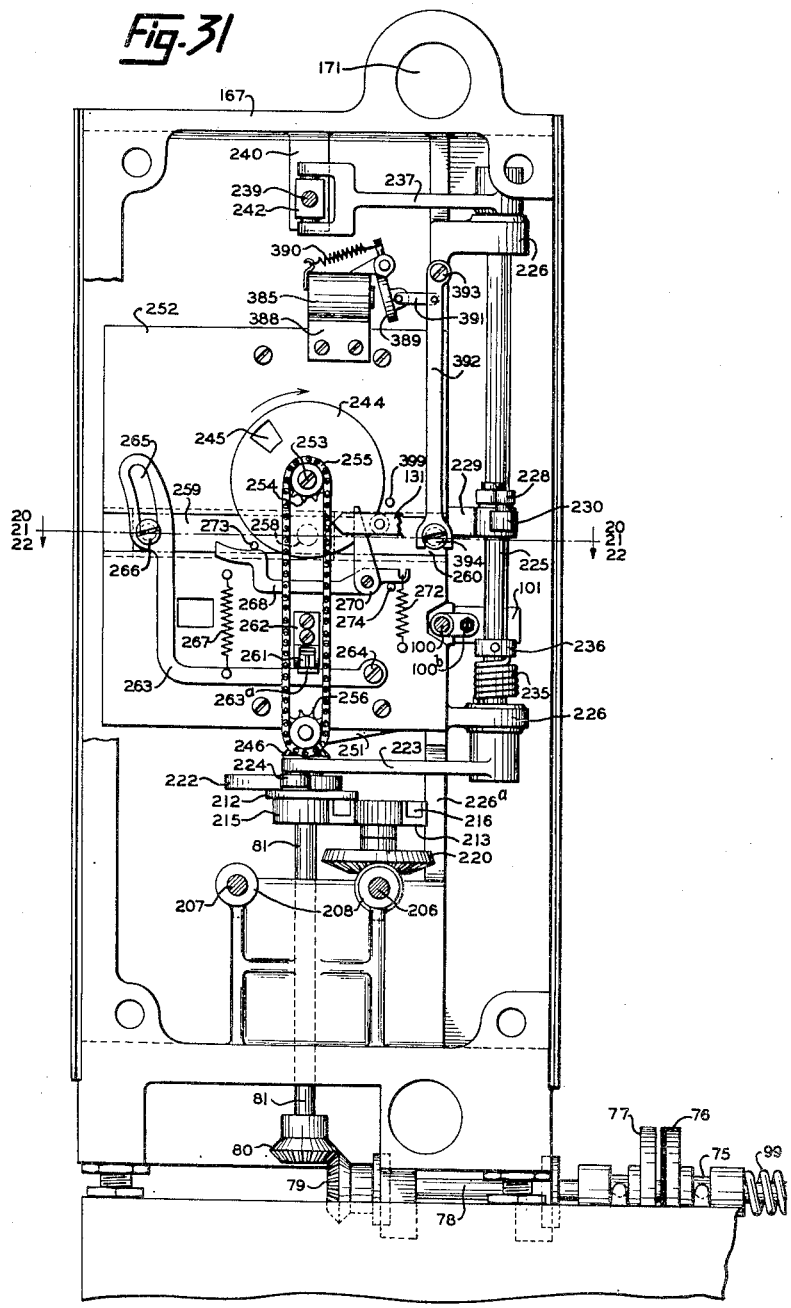
INVENTORS
HERMAN R. FREUND
FRITZ STADELMANN
BY
Curtis, Morris & Safford
ATTORNEYS

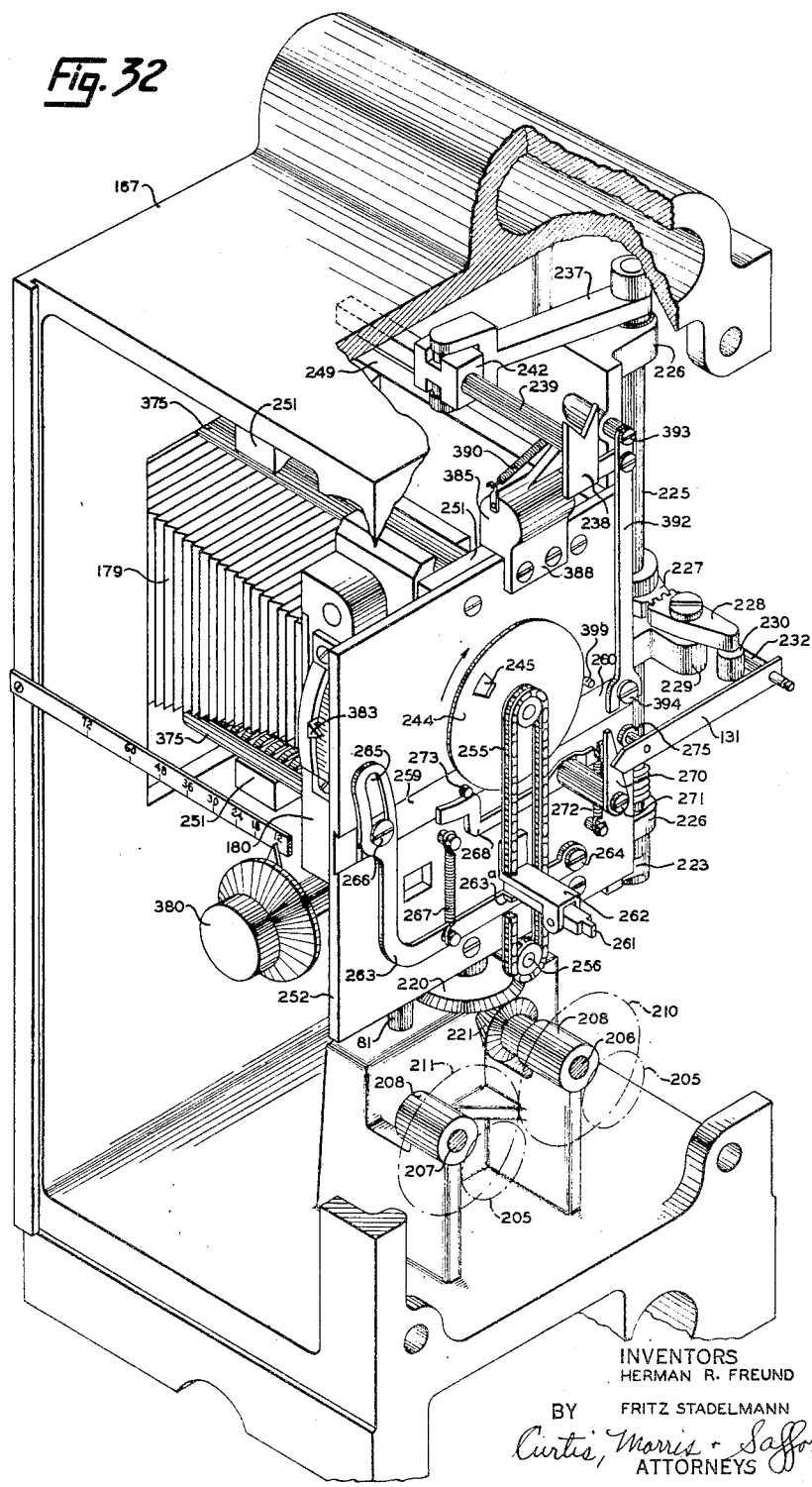

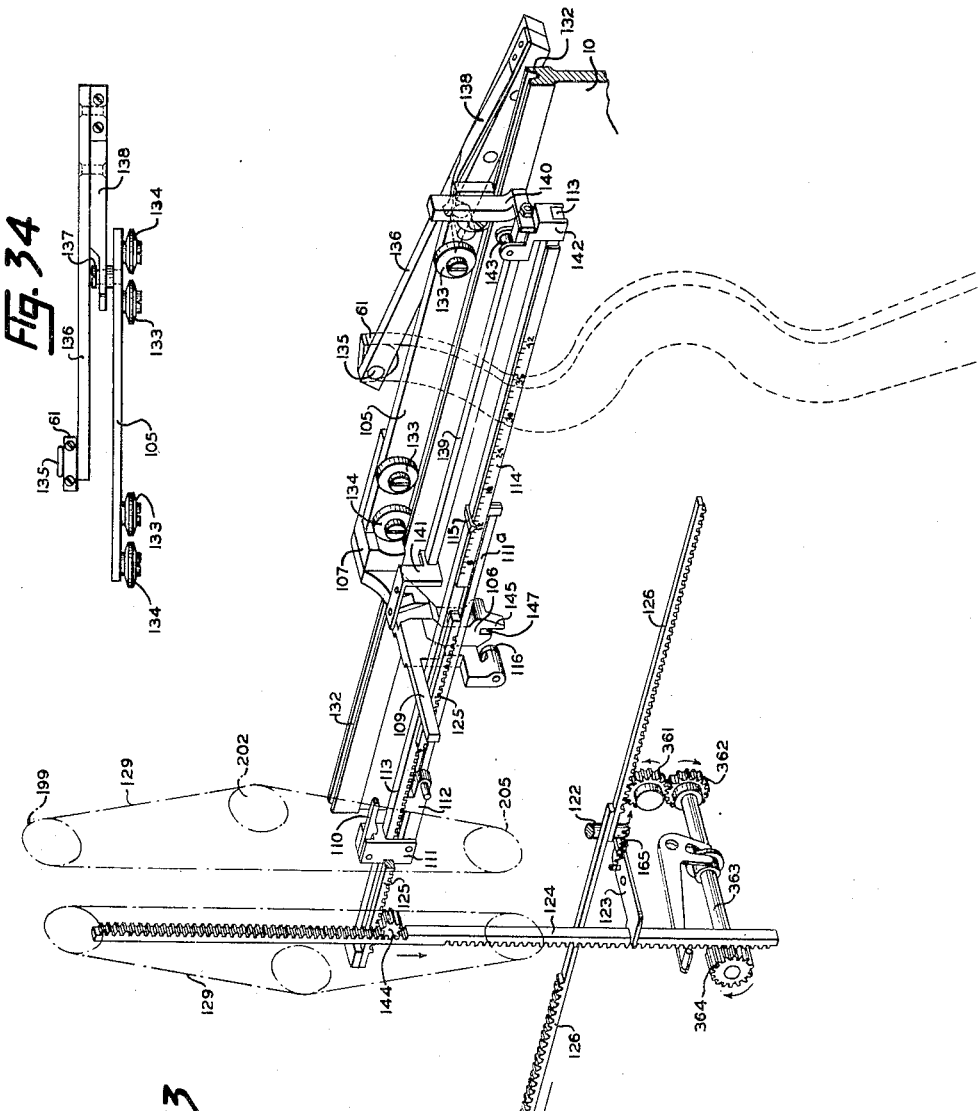

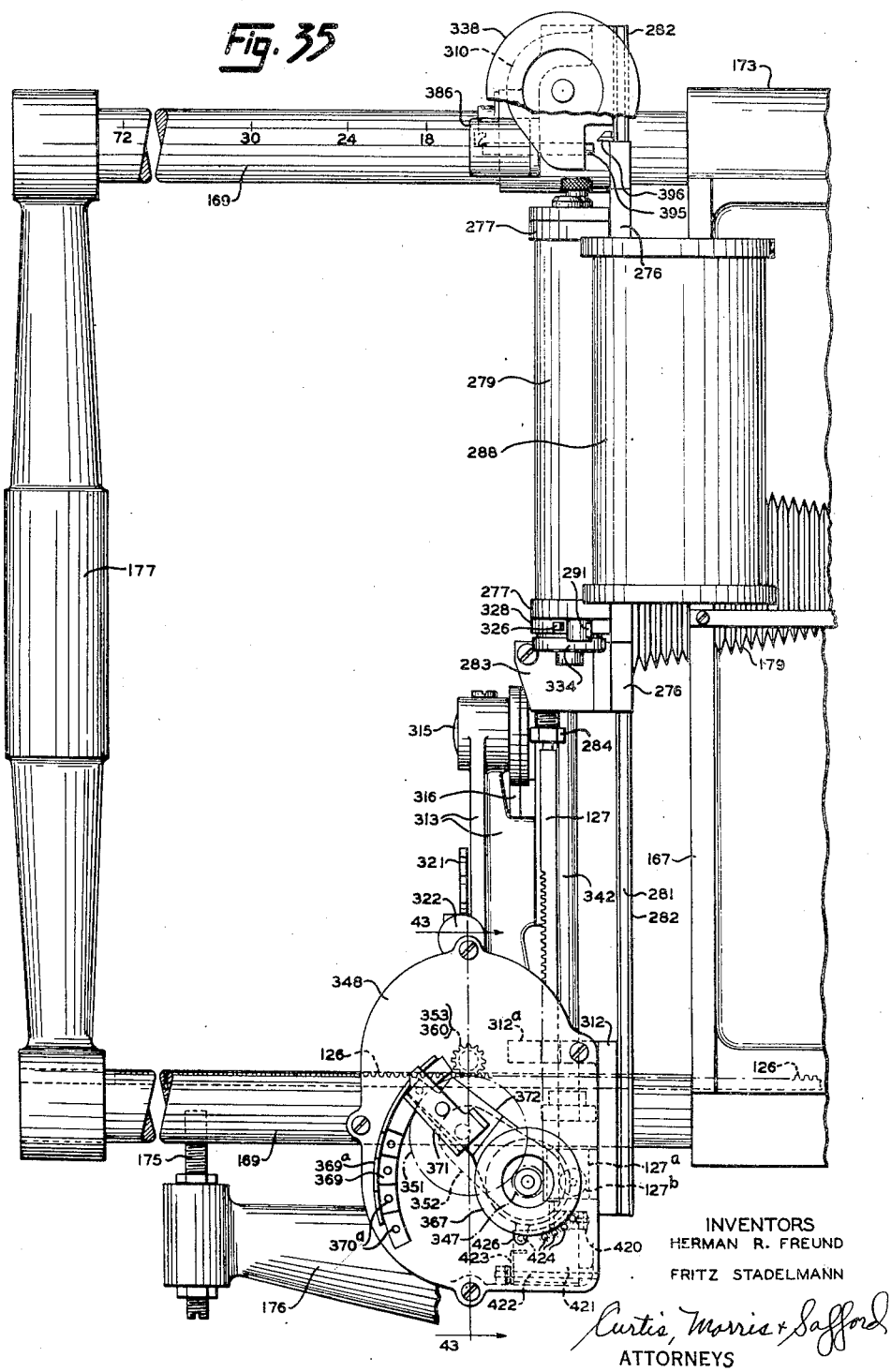

May 15, 1951     H. R. FREUND ET AL     2,552,881
PHOTOGRAPHIC TYPE COMPOSING MACHINE
Original Filed April 7, 1945     17 Sheets-Sheet 16
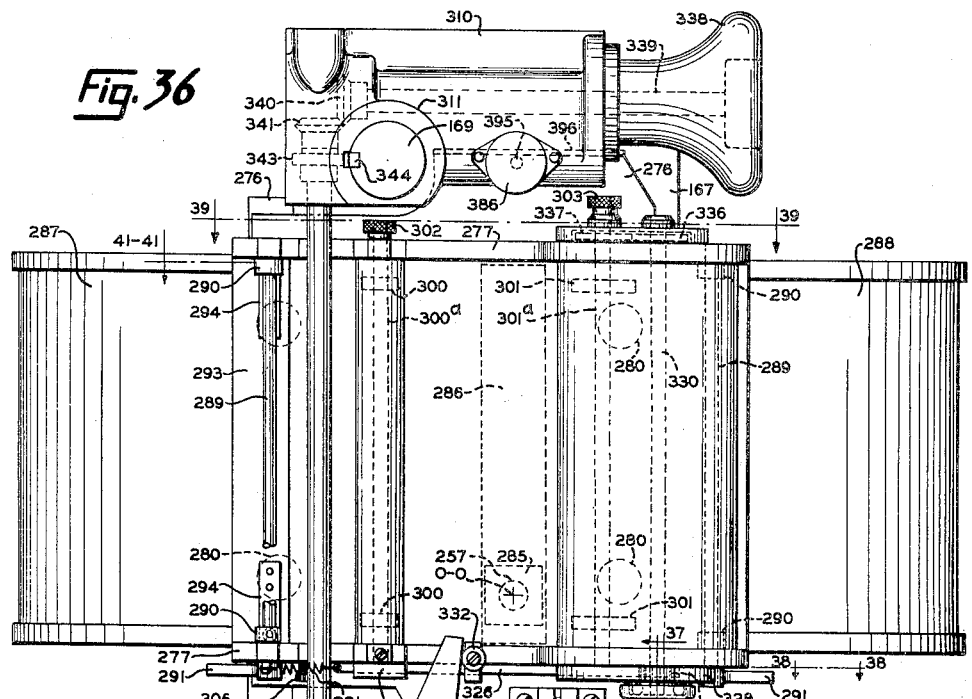
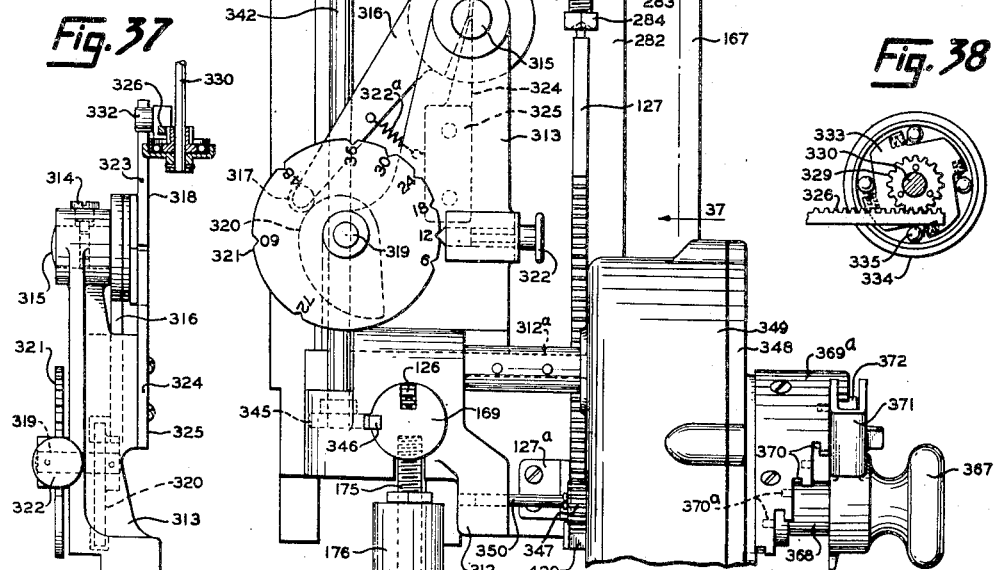
INVENTORS
HERMAN R. FREUND
FRITZ STADELMANN
BY Curtis, Morris & Safford
ATTORNEYS

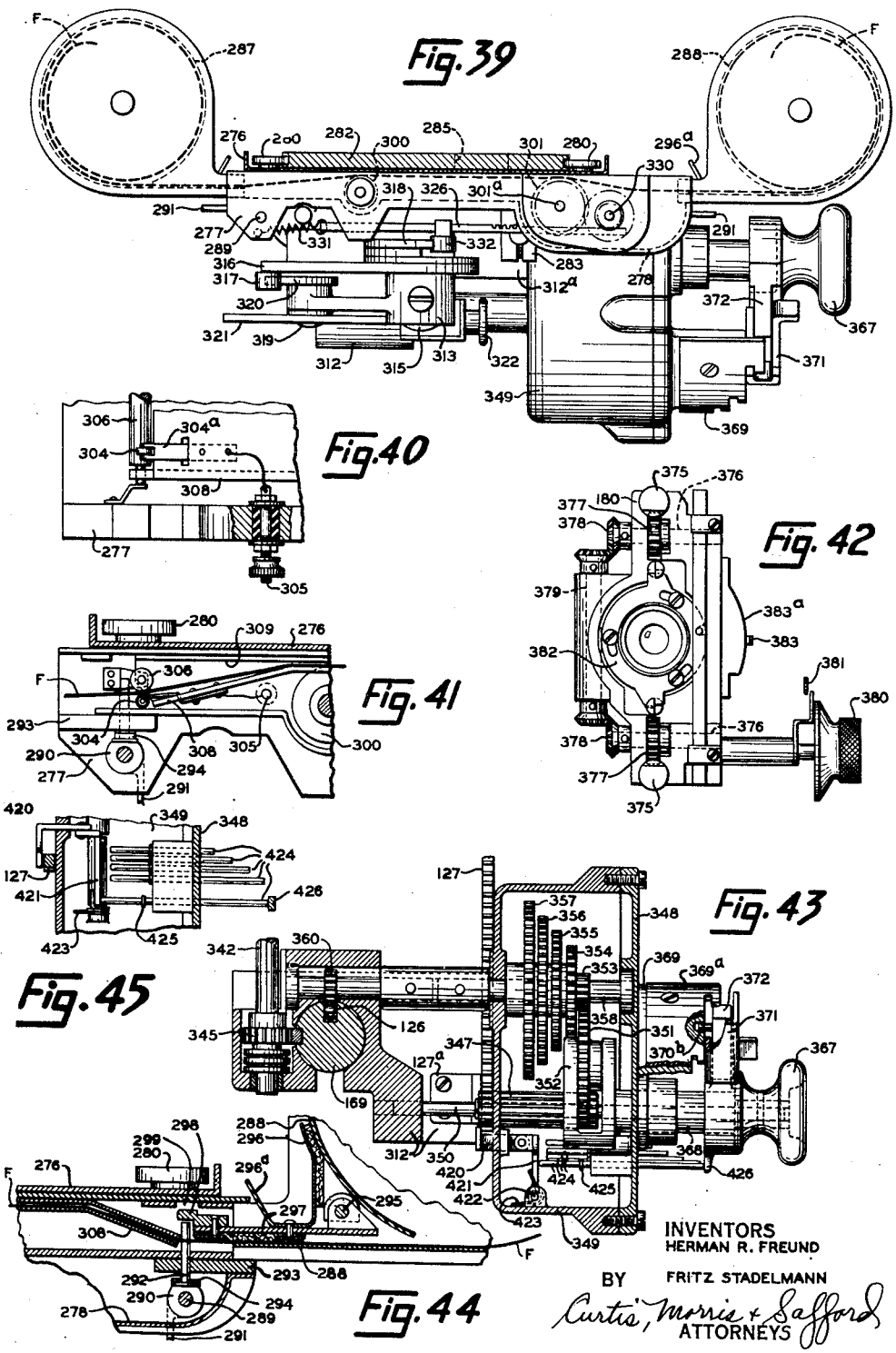

Patented May 15, 1951

2,552,881

UNITED STATES PATENT OFFICE 2,552,881

PHOTOGRAPHIC TYPE COMPOSING MACHINE

Herman R. Freund, Brooklyn, and Fritz Stadelmann, Valley Stream, N. Y., assignors to Intertype Corporation, Brooklyn, N. Y.

Original application April 7, 1945, Serial No. 587,062. Divided and this application March 23, 1949, Serial No. 82,964

37 Claims. (Cl. 95—4.5)

This invention relates to improved apparatus for photographically producing type matter for printing processes for offset and gravure printing, and more particularly to a machine for producing lines of printing type matter photographically by exposing type characters borne or represented by suitable elements individually and successively in the order of composition of the elements in a line, and recording the exposure in a spaced relation governed by a dimension of the respective elements which is representative of the setwise width of the particular character to be produced.

An organized machine capable of accomplishing this general result is disclosed in the copending application of Klingberg, et al., Serial No. 452,248, filed July 24, 1942, which matured into Patent No. 2,391,021 on December 18, 1945, and broadly viewed, the present invention is directed toward improved apparatus for increasing the utility, speed of production and efficiency of operation of a machine of this general nature.

The present invention is a division of the application Serial No. 587,062, filed April 7, 1945, now abandoned, by Herman R. Freund, Willard S. Curtis and Fritz Stadelmann.

Among the objects of the invention are the following: to provide simplified and improved mechanism for carrying out the line delivery, line confining and line justifying operations; to provide mechanism capable of greater speed of operation in displacing the line elements individually from the composed line and moving them successively to photographing and discharging positions; to provide for the employment of roll film and the feeding thereof automatically, both edgewise to receive the successive photographic impressions in line and in proper spaced relation and lengthwise to obtain a desired spacing between successive lines; to provide adjustments for producing images in a wide range of enlarged or reduced sizes and mechanism for altering the speed of operation of the element removing and photographing devices and correspondingly the rate of feed of the sensitized surface in conformity with the optical requirements as changed by such adjustments; to provide main and auxiliary light shutters of reduced weight and capable of faster operation; to provide additional and improved safety and operating controls including means to enable the blanking-out of an unwanted line, automatic drive controls for starting the operation of the element removing and photographing devices after the line justifying action and for stopping these devices upon discharge of the last element of each line presented thereto, and means to indicate exhaustion of the supply roll of film; and to provide parts throughout which minimize the factors of friction and wear and thus assure longer life and maintenance of accuracy at the desired greater speed of operation.

In the present embodiment, the character-bearing elements employed carry a photographably reproducible character disposed in a plane parallel to a flat or broad side of the element body, the thickness of which latter is equal to or proportional to the setwise width of the particular character borne thereby. Apart from the nature and arrangement of their reproducible characters, these elements are provided with upper and lower pairs of supporting and guiding lugs or ears and with combination distributing teeth, thus to accommodate them to the well known matrix storage, assembling and distributing facilities such as commonly found in commercial line composing and type slug casting machines of the general organization disclosed in U. S. Patent No. 436,532, granted to O. Mergenthaler on September 16, 1890.

Also, in the present embodiment, after the line of elements is composed (through manipulation of a keyboard) it is moved bodily endwise to a justifying position by delivery devices which act automatically to start the machine for the first part of its cycle of operation. Spacebands of well known form inserted between the words in the composed line of elements are then expanded in order to bring the line to an exact predetermined length defined by the space between a right hand end wall which is adjustable to the desired line measure and a fixed left end wall. The adjustable end wall stands in the path of a follower carried by the line delivery devices whereby to stop the delivery stroke at the line measure position and is movable vertically to lock the follower rigidly during the justifying operation.

While the line of elements is maintained in justified condition the adjustable end wall is withdrawn from locking relation with the follower and the main drive of the machine is then automatically stopped, the follower than subjecting the line to pressure endwise in a direction toward the aforesaid fixed end wall so that the leading line element is held firmly against said wall. The photographing mechanism and uni-directional moving mechanism such as a pair of opposed chains carrying a series of uniformly spaced pick-up members is then automatically set into operation for removing and feeding the elements individually and successively from the head or leading end of the line progressively to photographing and discharging positions along a guide channel of which the aforesaid fixed end wall is a part. A Geneva drive provides momentary dwells in the movement of the chains as the successive elements are presented by the pickup members first at a photographing position where they are aligned on the optical axis for photographic exposure and then at the discharging position. A safety shutter is opened by the first element moved into photographing position and is held open by a latch which latter is tripped by the aligning means in the absence of an element at the photographing position, for instance after the last line element is moved out of such position, so that the safety shutter automatically closes. A main rotary exposure shutter driven at a constant predetermined speed enables the successive exposures to take place in timed relation to the presentation of the respective elements on the optical axis. After each removal of an element the remaining elements are advanced bodily endwise by the line follower a distance governed by the body thickness of the removed element and through suitable connections of the follower to a holder for the sensitized photographic impression receiving medium (a roll of sensitized paper or film) this medium is correspondingly advanced edgewise to effect proper relative spacing of the characters successively reproduced photographically in line.

The elements are fed by the removing mechanism from the photographing position to a discharging position at the top of the aforesaid guide channel where they are pushed off their pick-up members onto an elevator similar generally to the familiar record elevator found on commercial line composing machines. After discharge of the last removed element the feeding and photographing mechanisms are automatically stopped and the main drive of the machine is then started again for completion of its full cycle of operation. The second elevator with the accumulated line of discharged elements thereon is then raised to present such elements to distributing devices which serve to separate and return the individual elements according to character to their proper channels in storage magazines of well known form. During this part of the machine cycle various other mechanisms are restored to their starting positions ready to receive and handle a succeeding composed line. Upon return of the film holder to starting position suitable adjustable control mechanism operates to feed the film endwise (columnwise) from the supply roll a desired distance for line spacing purposes.

The foregoing and other objectives and the apparatus involved for performing the above outlined operations will be described hereinafter in detail in connection with the embodiment shown in the accompanying drawings. However, the form of the machine as a whole as well as the form and arrangement of the various mechanisms and elements employed and their precise manner of operation for accomplishing the essential aims of the invention may differ from that herein shown and described without departure from the spirit of the invention. It is therefore to be understood that the invention is limited only insofar as expressed in the appended claims.

In the drawings:

Figure 1 is a partial front elevation showing portions of the element storage and assembling mechanism and the associated line composing, line delivery and line justifying channels as well as portions of the spaceband distributing mechanism.

Figure 1a is a perspective view of one of the character bearing elements employed in carrying out the invention.

Figure 2 is a partial front elevation of a portion of the structure illustrated in Fig. 1 and shows the housing adjacent to the left end thereof containing the element displacing and photographing mechanisms.

Figure 3 is a section taken on the line 3—3 of Fig. 2 but with the photographing devices removed.

Figure 4 is an end elevation on the line 4—4 of Fig. 2.

Figure 5 is an elevation viewed from the left side of the machine and showing the main operating cams and levers, the several supporting shafts being shown in section.

Figure 5a represents schematically the position of various operating levers relative to their controlling cams on the main cam shaft when the latter is brought to rest during the element photographing operation.

Figure 6 is a plan view of the operating cams and levers, the main driving clutch and the clutch drive from the intermediate shaft for the element displacing and photographing devices.

Figure 13 is a perspective elevation of portions of the line embracing and line justifying parts and supports therefor as viewed from the rear left side.

Figure 14 is a plan view of the cross tie to which the operating lever for the line embracing parts in Fig. 13 is connected.

Figure 14a is a fragmentary section taken on the line 14a—14a of Fig. 14.

Figures 15, 16 and 17 illustrate the line embracing and line justifying devices in their relative positions respectively for receiving a line delivered to the justifying position, for embracing and justifying said line and for releasing said line while holding it in justified condition.

Figure 18 is a fragmentary plan view partly in section as viewed generally on the line 18—18 of Fig. 3.

Figure 19 is a fragmentary plan view of a switch and rod operated by the line delivery lever to control starting of the second part of the machine cycle.

Figures 20, 21 and 22 are sectional plan views on the line 20—21—22 of Figure 31 and show the safety shutters in closed, open and safety operated conditions respectively.

Figure 23 is a fragmentary elevation showing the safety shutters held in open position by their controlling parts.

Figure 24 is a side elevation as viewed from left of the assembled inner and outer plates which form the right hand wall of the housing shown at the left side of the machine in Fig. 2.

Figure 25 is a side elevation of the outer one of the two plates of Fig. 24, this plate being shown detached in order to illustrate details of its construction.

Figure 26 is a vertical section taken on the line 26—26 through the assembled plates in Fig. 24.

Figure 27 is a vertical section taken on the line 27—27 through the assembled plates in Fig. 24.

Figure 28 is a circuit diagram including schematic representations of the involved mechanisms.

Figure 29 is a fragmentary front elevation in full size showing a leading line element in position for displacement upwardly in the feed channel by the pick-up slides on the unidirectional moving chains.

Figure 30 is a fragmentary perspective view showing details of construction of the element pick-up slides.

Figure 31 is an elevation as viewed on the line 31—31 of Fig. 2 with the element feeding devices removed to better show the main rotary shutter and driving connections therefor within the housing at the left side of the machine.

Figure 32 is a perspective view of the housing and mechanism therein of Fig. 31.

Figure 33 is a perspective view of the line delivery and line advancing devices and their connections for advancing the film for the exposures of the elements individually displaced from the line.

Figure 34 is a plan view of the line delivery slide bar shown in Fig. 33 and its connection to the line delivery lever.

Figure 35 is a front elevation showing the vertically movable film holder and adjusting devices therefor disposed at the left of the housing containing the photographing and element displacing mechanisms as shown in Fig. 2.

Figure 36 is an end elevation of the film holder and adjusting devices shown in Fig. 35.

Figure 37 is a front elevation, partly in section on the line 37—37 of Fig. 36, of the linespace adjusting parts shown in Fig. 36.

Figure 38 is a detail of the line-space clutch.

Figure 39 is a plan view, partly in section on line 39—39 of Fig. 36 of the film holder and adjusting devices shown in Fig. 36.

Figure 40 is an enlarged fragmentary detail in elevation of parts at the lower end of the film holder for detecting electrically the exhaustion of the supply roll of film.

Figure 41 is an enlarged plan view of the parts shown in Fig. 40 as seen from the line 41—41 in Fig. 36.

Figure 42 is an end elevation of the adjustable lens holder.

Figure 43 is a fragmentary vertical section taken generally on the line 43—43 of Fig. 35, showing change-ratio gearing for varying the extent of the letter-by-letter feed of the film.

Figure 44 is an enlarged fragmentary plan view showing details of the clamping means for detachably mounting the film magazines on the film holder.

Figure 45 is a fragmentary plan view showing the automatic stop and actuating mechanism therefor for supporting the film holder when adjusting the change-ratio gearing shown in Fig. 43.

Figure 7:
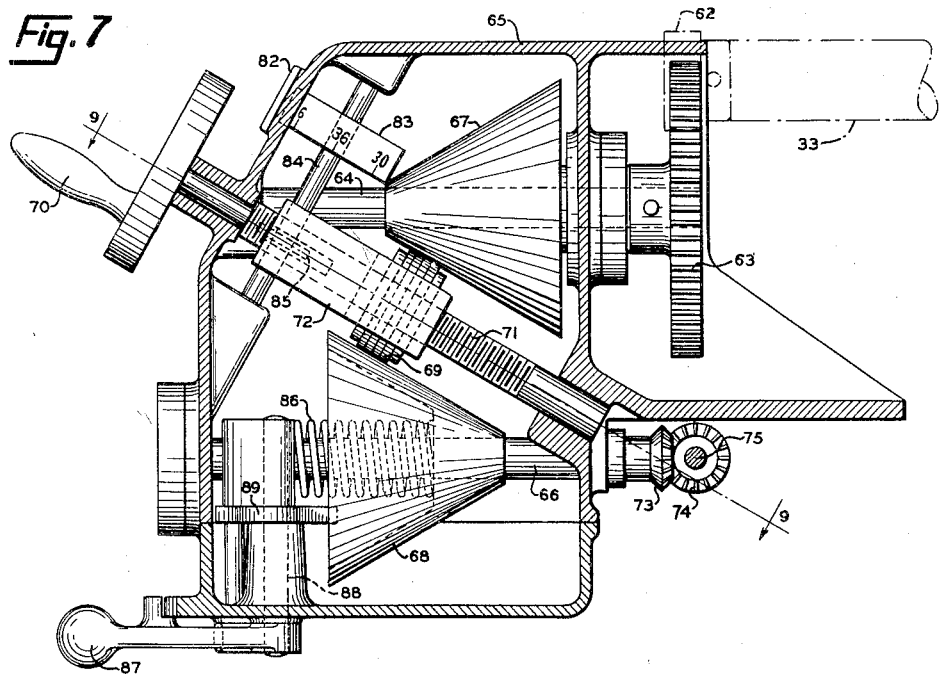
Figure 7 is a front elevation in section of the housing and contained parts for controlling the speed of drive of the element displacing mechanism.

As already indicated, the invention is disclosed by way of example as applied to a machine equipped with element storage, assembling and distributing mechanisms such as employed in commercial typographical line composing and slug casting machines of the general class set forth in U. S. Patent No. 436,532. Since the construction and operation of these mechanisms is so well known to those skilled in the art only fragments of some of the storage and assembling parts are shown herein, the distributing mechanism proper being omitted entirely.

*Element storage, assembling and distributing devices*

Referring to Fig. 1 of the accompanying drawings, the numeral 1 designates a fragment of a forwardly inclined magazine of the usual trapezoidal shape as employed for storing the well known matrices from which character-bearing type slugs are cast, such storage magazine having top and bottom plates which are channeled or grooved on their opposed inner faces for supporting edgewise between the plates columns of the character-bearing elements or matrices. Each column is long enough to hold a supply of elements bearing a given character and there may be as many columns as required to make up a complete font which usually comprises at least the lower case and the capital letters of the alphabet and the usual numerals, and also the ordinarily used punctuation marks.

The upper end of the magazine 1 cooperates with distributing mechanism (not shown) such as commonly found on commercial matrix composing and line casting machines and which serves to conduct the elements back to their proper storage channels after they have been circulated through the various mechanisms of the machine for reproduction. The well known combination teeth A on the elements, see Fig. 1ª, support them while they are propelled, through engagement of their ears or lugs in spiral threads of rotating screws, along a ribbed combination bar of the distributor to drop-off points vertically aligned with the respective magazine channels.

At its lower end the magazine 1 cooperates with a so-called assembler from 2 having a series of partitioned passages 3 through which the elements fall by gravity when released by the operation of suitable escapements (one for each magazine channel) in response to manipulation of a keyboard (not shown). The released elements gravitate to a downwardly inclined and constantly running belt 4 which directs them over a rotating assembler star wheel 5 which acts to flip them upright into the usual line supporting channel of the so-called assembling elevator 6. Here the first incoming element encounters a line resistant 7 which is secured in well known manner to the left end of the usual assembler slide (not shown), the latter being under spring tension to the right and having a pointer and scale whereby the operator may set the extent of leftward travel of the slide under the influence of the elements successively added to the composed line. A scale 6ª on the elevator 6 indicates the growth of the line under composition as the resistant 7 advances. As customary, as the length of the composed line approaches the ultimate desired line length (indicated on the scale 6ª) the operator ceases his composition and relies upon the expansible spacebands to bring the line to the desired length by expansion of the word spaces.

Character-bearing elements and spacebands

A character element of suitable form for carrying out the present invention is illustrated in Fig. 1a, such element being similar to those disclosed in U. S. Patent No. 2,231,899, granted February 18, 1941, to H. R. Freund, and resembling generally the intaglio character-bearing matrices employed in the well known typographical machines. For photographic purposes, and as distinguished from such matrices, the reproducible character is carried on a plaque B such as a piece of film mounted on the body portion of the element M and disposed in a plane parallel to the broad or flat sides of the element body. The edgewise thickness of the element body, the dimension C, is made equal to or proportional to the setwise width of the particular character on the plaque B and this dimension is used, as will later be seen, to determine and control the actual advance of the sensitized film, or the film holder, after each exposure of a character. The characters are preferably placed recumbent relative to the height of the element so that for the successive photographic exposures in line formation the film (or the holder for it) may be fed downwardly with the aid of gravity.

The elements are provided with the usual upper and lower sets of edgewise projecting ears or lugs D and E respectively and the combination distributing teeth A. The lugs D and E on all of the elements of a font are alike in thickness so that such lugs may be used to guide the elements, regardless of their variant body thicknesses for different width characters, through a common guide or feed channel to the photographing devices of the machine. The notch K in the rear vertical edge of the elements cooperates with a slide member having a V shaped end and adapted to engage said notch to align the character of each element at photographing position in the aforesaid feed channel. The location of this notch bears a definite relation to the location of the different characters on the plaques B of the elements, that is, the apex of the notch lies at the same distance in all cases from the point of intersection of fixed horizontal and vertical base lines which establish the location setwise and vertically of all characters.

The spacebands S are of the well known two-part sliding wedge construction employed in typographical machines except that they have upper and lower supporting lugs corresponding to those of the character-bearing elements and also have a notch corresponding to the notch K in said elements. The spacebands are stored on downwardly inclined rails of a storage box generally designated G in Fig. 1 from which they are released by operation of a spacer key (not shown) for assembly between words, a chute H serving to guide the released spacebands in gravity flight down to the assembling point in front of the star wheel 5. As well known, the spacebands act to spread or expand the spaces between the words in a line, thus to bring a composed line of character-bearing elements to a desired length prior to reproduction of the characters.

Machine framework and main drive

The machine is supported on a rigid pedestal or base 8, the upper portion of which is shown in Fig. 5. Upon this base is erected the principal framework members such as the vertical column 9, Fig. 5, the front or face plate 10, Fig. 1 (a casting extending across the front of the machine and shown in end elevation in Fig. 4), and the main cam shaft supporting brackets 11, Figs. 5 and 6. The conventional supporting framework, a lower end fragment 9a of which is shown in Fig. 5, for the distributing mechanism (not shown) and magazines is secured to the column and face plate in well known manner.

As seen in Figs. 5 and 6, the main cam shaft 12 is horizontal and is carried by suitable bearings in the brackets 11. This shaft is driven by a gear wheel 13 secured thereto and meshing with a driving pinion (not shown) secured to a drive shaft 14 disposed parallel to and below the cam shaft 12. The drive shaft 14 is adapted for coupling and uncoupling with respect to the usual driving clutch arrangement having toggle arms 15 for moving clutch shoes (not shown) into and out of engagement with the inner face of a flanged pulley 16, the latter being constantly driven by means of a belt 17 connected to a pulley on the motor 18, all in well known manner.

As usual, the clutch may be operated manually or automatically. For manual operation there is provided a handle 19, pivoted at 19a, at the front of the machine, said handle being connected to a fore and aft slide bar 20 carrying a pin 21 adapted, when the bar is pulled forwardly, to rock the usual hollow vertically disposed starting lever 22 anticlockwise so that an arm 23 at its upper end swings and dislodges the usual stopping pawl 24 from its seat on the top flat edge of the pivotally mounted clutch operating pawl 25. Such dislodgement of pawl 24 allows pawl 25 to be rocked clockwise by a cooperating pivoted pawl 26 bearing at its lower end against an arm of the usual forked clutch operating lever 27 which latter is free to rock anticlockwise under the influence of the usual main clutch spring (not shown) and thus engage the clutch whenever pawl 24 is dislodged.

Pawls 25 and 26 are both mounted as usual for pivotal movement (one by the other) in opposite directions and in a vertical plane on pins secured in a rigid vertical shaft disposed within the hollow and rockable shaft 22. Pawl 24 and a similar pawl 28 are pivotally mounted in yoke-like bearing lugs formed as usual in the web of the gear wheel 13. When pawl 24 is dislodged from its seat on pawl 25, the clutch spring at once acts to engage the clutch for turning the main cam shaft 12 through a partial cycle (about 150 degrees) whereupon the similar pawl 28 comes around and rocks pawls 25 and 26 on their respective pivots to effect disengagement of the clutch. Such disengagement occurs when the depending arm of pawl 26 swings lever 27 clockwise on its pivot 27a in opposition to the main clutch spring.

The clutch is operated automatically through the medium of a clutch operating relay 29, Fig. 28, the pivoted armature arm 29a of which is shown in Fig. 5.

When the clutch operating relay is energized, through closing of the contacts of a starting switch 30, see Figs. 1 and 28, a dog 31 at the free end of the armature arm 29a is thrown into the path of rotation of a toothed wheel 32 fixed on the usual intermediate shaft 33 which latter is constantly driven anticlockwise in known manner by a belt 34 running over a pulley 34a on the cam shaft 12, see Fig. 6. When struck by the teeth on wheel 32 the armature arm 29a is immediately kicked backward and a vertically disposed lever 35, Fig. 5, to the upper end of which the armature arm 29a is pivoted is then rocked anticlockwise on its fixed pivot 36. At its lower end lever 35 is connected by a horizontal link 37 to an arm 37ᵃ of the vertical starting lever 22 so that rocking of lever 35 results in rocking lever 22 anticlockwise whereupon arm 23 of lever 22 swings against the side of pawl 24 to dislodge it. Upon dislodgement of pawl 24 the main clutch is thrown into driving engagement for turning the cam shaft 12 through a partial cycle in the manner described above in connection with manual operation of the clutch.

When pawl 28 comes around and seats on pawl 25 the clutch is disengaged and the cam shaft then stops and remains at rest until pawl 28 is dislodged by a second operation of the starting relay and rocking of lever 35. This occurs after discharge of the last line element from the feeding and photographing mechanism, the cam shaft then turning through the remainder or second part of its cycle (about 210 degrees) whereupon pawl 24 comes around and seats on pawl 25 whereby to disengage the clutch. During the rest period between the operating cycles of the cam shaft the element removing and photographing mechanisms are set into operation for feeding the line elements one-by-one from the leading end (the left end) of the justified line to the photographing and discharging positions, all as will later be described.

*Main cams and their functions*

With but slight modifications in respect to timing and specific location, the cams herein provided on the main cam shaft 12 correspond to similar cams shown and described in the pending application of Klingberg et al., referred to at the beginning of this specification.

Thus, referring to Figs. 5 and 6, there is provided the usual distributor shifter cam 38 which serves in well known manner to oscillate the usual shifter lever 39, the latter being an upwardly extending lever provided at its upper end with a pusher adapted to sweep an accumulated line of elements or matrices bodily endwise off the usual ribbed second elevator bar 40, see Figs. 1 and 2, onto the main ribbed distributor bar (not shown).

A second elevator cam 41 is provided which operates as usual through a roller 41ᵃ and suitable link connections to raise and lower the elevator arm 42 between the "down" position for receiving discharged elements on the ribbed bar 40 (indicated in Figs. 1 and 2) and the "up" or line distributing position.

A justification cam 43 is provided for raising and lowering the spaceband driver 44, Fig. 13, connected to the forward end of the justification lever 45 which is pivoted on a rigid shaft 46.

A justification locking cam 47 serves to operate the justification driver locking bar 48, Figs. 6 and 13, in a fore and aft direction, bar 48 being connected to the forward end of the two part operating rod 49. Rod 49 is supported for fore and aft sliding movement in a bracket 50 and is held in lock releasing position against the tension of a spring 51 when the roller 52 on an arm 53 pivoted at 54 rides on the raised portion of cam 47, as indicated in Fig. 5.

Still another cam 55 is provided for raising and lowering the line embracing jaw bar 56, Figs. 1 and 13, connected to the forward end of a lever 57 pivoted on the shaft 46, see Figs. 5 and 6.

The usual line delivery cam 58, Fig. 6, is also provided, this cam being constituted by a flange extending from the side surface of the gear wheel 13 and the contour of such flange being disposed for contact with a roller 59 only for returning the delivery lever 61 to its starting position during the second part of the cam shaft cycle, that is, after the delivery lever has pressed the composed line endwise (leftward in Fig. 2) for removal of the last line element therein by the feeding devices and after such element has been photographed and discharged onto the second elevator 40.

Finally, with reference to Figs. 5, 6 and 28 there is provided on the cam shaft 12 a timing disk X which carries a pair of lugs $y$ and $z$ for operating the spring plunger switches Y and Z respectively in the circuit of the clutch operating relay 29. In the idle position of the machine, as indicated in Fig. 5, the lug $y$ holds switch Y closed so that the clutch relay circuit is conditioned for starting the cam shaft as soon as the starting switch 30 is momentarily closed, as it is upon delivery of a composed line to justifying position as hereinafter pointed out. As soon as disk X starts turning with the cam shaft, lug $y$ moves off the plunger of switch Y and this switch then opens. When the cam shaft is stopped by pawl 28 (after about 150 degrees of rotation) lug $z$ depresses the plunger of switch Z and holds this switch closed so that the clutch relay circuit is conditioned for starting the second part of the cam shaft cycle as soon as another switch 101 in the relay circuit is closed by the delivery lever 61 as the latter reaches the end of its leftward stroke, all as later explained in detail. When the cam shaft starts turning again, lug $z$ moves off the plunger of switch Z which then opens, and when the cam shaft is stopped at the end of the machine cycle by pawl 24, lug $y$ again closes switch Y ready for the next machine cycle to start when switch 30 is closed upon delivery of the next composed line.

*Drive and clutch for element feeding and photographing devices*

Figure 8:
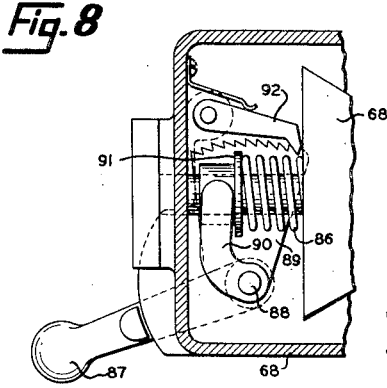
Figure 8 is a fragmentary section showing details of the tension adjusting parts for the drive shown in Fig. 7.
Figure 9:
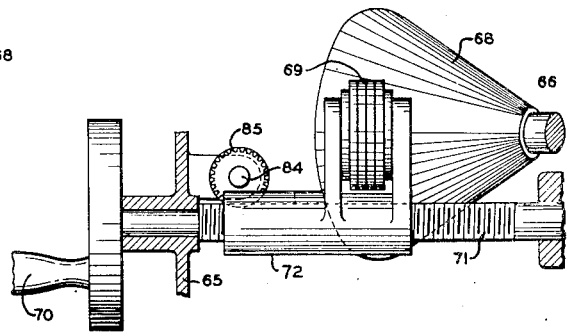
Figure 9 is a fragmentary section taken on the line 9—9 of Fig. 7.

The element feeding mechanism and the main photographic shutter are driven from the constantly rotating intermediate shaft 33 and for enlargement purposes, as later described, a variable speed gearing is provided. Thus, referring to Figs. 5 to 9, inclusive, a pinion 62 at the outer (left) end of shaft 33 meshes with a gear 63 secured to the outer end of a shaft 64 of a suitable adjustable driving unit contained in a housing 65. As best seen in Figs. 7, 8 and 9, the housing 65 is arranged to rotatably support the parallel shafts 64 and 66. Shaft 66 is driven from shaft 64 through the medium of a pair of opposed cones 67 and 68 on the respective shafts and an adjustable transmission member comprising a plurality of rotatable disks 69 the axes of which are in the plane of the axes of the shafts 64 and 66. By turning a handle 70 on a screw spindle 71 on which a bracket 72 carrying the disks 69 is threaded, the disks may be adjusted longitudinally of the spindle whereby to vary their disposition along the surfaces of the cones and thus alter the speed transmission ratio. Thus it will be evident that when the disks 69 ride on the smaller diameter portion of cone 67, cone 68 and shaft 66 are driven at a speed slower than that of gear 63, and when the disks 69 are adjusted to ride on the larger diameter portion of cone 67 they drive shaft 66 at a greater speed than that of gear 63.

At the outer end of shaft 66 is a miter gear 73 which meshes with a companion gear 74 on the end of a shaft 75 to which is secured the constantly rotating clutch disk 76. The other clutch disk 77 is secured to the end of a shaft 78 (see Figs. 2 and 6) provided at its other end with a miter gear 79 which meshes with a companion gear 80 secured to the lower end of a vertical shaft 81 which drives the element displacing chains and photographic shutter, as later described. To assist in adjusting the speed of drive of the chains and shutter in accordance with different degrees of enlargement, the housing 65 is provided with a window 82, Figs. 5 and 7, through which the operator may read a point-size scale on a disk 83. The disk 83 is secured to a shaft 84 which turns in harmony with the rotation of spindle 71 by handle 70, a worm gear 85 on shaft 84 meshing with the threads on spindle 71 to effect such harmonious rotation of the scale disk.

For maintaining driving traction of member 69 against the surfaces of cones 67 and 68, the latter cone is mounted for sliding movement on its shaft, as by means of a key and slot connection with the shaft, and a spring 86 urges the cone to the right as viewed in Figs. 7 and 8. The tension of spring 86 may be altered by an operating handle 87 secured to a shaft 88 which latter carries a ratchet member 89 and an arm 90. Arm 90 bears against a collar 91 which is slidable on shaft 66. By swinging handle 87 upward as viewed in Fig. 8, or inwardly as viewed in Fig. 7, spring 86 may be compressed whereby to drive the cone 68 more firmly against the rotary disks 69. A spring pressed pawl 92 is provided for retaining the ratchet 89 in adjusted position.

It will be obvious that in lieu of the change-speed drive just described for the element feeding mechanism and shutter, the exposure period may be varied to suit a limited range of enlargement simply by employing a shutter having an adjustable aperture.

Figure 10:
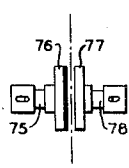
Figures 10, 11 and 12 illustrate schematically the driving clutch for the element displacing mechanism in non-operating, active and driving conditions respectively.
Figure 11:
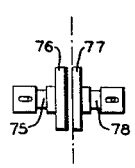
Figure 12:
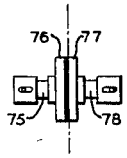

The clutch disks 76 and 77 operate in the following manner. The disk 77 is shiftable by the control handle 19 from the non-operating or locked position indicated in Fig. 10, to the active position shown in Fig. 11. The connections to handle 19 for this purpose comprise a vertical lever 93 pinned to a cross shaft 94, Fig. 6, which is rockable in a bracket 94ª and carries at its outer or free end a forked lever 95 the arms of which latter engage a shiftable collar on the shaft 78. When handle 19 is shifted from the locked or full line position shown in Fig. 6 to the neutral position indicated by dot-dash lines the yielding connections designated 93ᵇ to the toggle link 93ᶜ to which the handle is pivoted act to rock lever 93 and shaft 94 anti-clockwise. As a result, forked lever 95 swings and shifts disk 77 leftward to its active position, Fig. 11, where said disk stands in condition to be driven by the constantly rotating disk 76 when the latter is shifted into engagement therewith.

For holding disk 76 out of driving relation with respect to disk 77 there is provided a solenoid 96, the core member of which is pivotally connected to a forked lever 97 pivoted at 98. The arms of lever 97 engage a collar attached to the clutch disk 76 whereby to hold the clutch spring 99 compressed whenever solenoid 96 is energized. When the solenoid 96 is de-energized spring 99 acts to advance the clutch disk 76 into driving engagement with disk 77, thus to set the element displacing mechanism and photographic shutter into operation.

The clutch disk 76 is retracted to stop operation of the element displacing mechanism and shutter through re-energizing of the solenoid 96. This occurs when the delivery lever 61 reaches the end of its leftward stroke and after discharge of the last photographed element onto the second elevator 40. At this time the delivery lever 61 actuates a slidable rod 100 which closes a switch 101, see Figs. 19 and 28. Through switch 101 and the switch Z (held closed at the time by lug z on the disk X) the circuit through the clutch operating relay is completed. Upon tripping of the momentarily closed armature 29ª of this relay by the toothed wheel 32, the stopping pawl 28 is dislodged, as previously explained, and the main cam shaft 12 starts the second part of its cycle of operation. After about 80 degrees rotation the rise on the second elevator cam starts this elevator on its upward stroke whereupon a switch 102, Figs. 1, 2 and 28, is opened, this switch having been held closed by the elevator while in its "down" or element receiving position shown in Fig. 2. The contact arm of an auxiliary relay 103, Fig. 28, is held in circuit breaking condition whenever this relay is energized through the closed switch 102. But as soon as the elevator 40 rises and allows switch 102 to open, relay 103 is de-energized and its contact arm immediately springs to circuit closing position as indicated in Fig. 28. As a result, the solenoid 96 in this circuit is energized and yoke arm 97 is rocked anti-clockwise, thus retracting the clutch disk 76 from driving engagement with the companion disk 77.

*Outline of operations during a complete machine cycle*

A cycle of operation of the machine is completed for each composed line and the steps of the cycle are carried out as follows:

1. The assembling elevator 6 is first raised manually, with the composed line of elements therein, from the assembling position shown in Fig. 1 to the usual line delivery level. When so raised, the rear wall of the elevator rocks a pivoted latch assembly 104, thus to release the line delivery slide 105 for its leftward or line delivery stroke from starting position. It will be remembered that cam 58 acting on roller 59, Fig. 6, serves to place the slide 105 (linked as usual to the delivery lever 61, see Fig. 33) in its starting position where it is held by latch 104 against the tension of spring 108.

2. When so released, the delivery finger or line follower 106 fixed to a block 107 on slide 105, see Fig. 33, is moved leftward from the starting position indicated by dot-dash lines in Fig. 1 under the influence of spring 108. The line of elements ahead of finger 106 is thus pushed leftward into the so-called delivery channel 160 where the elements hang by gravity on fixed supporting rails 160ª, Figs. 1 and 4. During the delivery stroke, a forwardly extending arm 109 of the delivery finger rocks and finally locks under a spring-pressed latch 110 pivoted in a rider 111 which, by means of a detent 112 (spring-pressed upwardly) is previously set at the desired line measure position along a toothed bar 113. Bar 113 carries an em scale 114 and a rod 111ª secured to and extending to the right from the rider 111, said rod having a pointer 115 for indicating the scale reading by which to set the rider. Also during the delivery stroke of slide 105, the elevator 6 is sustained at its raised level by a roller 116 on a depending arm disposed forwardly of finger 106, said roller riding along the underside of a horizontal lip or rail 117 projecting forwardly from the front wall of the elevator, see Fig. 4.

3. The line delivery stroke is stopped by a lug 146 at the upper end of the adjustable line embracing jaw 119 carried by the embracing jaw bar 56, see Figs. 1 and 13, and normally disposed in the path of leftward movement of a lug 145 of the finger 106. Jaw 119 is set in advance at the same line measure as rider 111 but in accordance with an em scale 56ᵃ and the arrangement is such that finger 106 encounters lug 146 at the same instant that arm 109 of the finger locks under latch 110.

4. While latch 110 is held tilted by arm 109 (just before the delivery stroke is stopped by lug 146) the latch presses upwardly the closely overlying operating bar 118 of the starting switch 30. As a result switch 30 is momentarily held closed until latch 110 snaps down to lock with arm 109.

5. The starting relay circuit is completed by the closing of switch 30 and the cam shaft now turns, in the direction of the arrow in Fig. 5, through the first part of its cycle, about 150 degrees as previously explained. During this part of the cam shaft cycle the following actions take place:

(a) Roller 57ᵃ follows the depression 55ᵃ in cam 55 and permits elevation by lever 57 of the line embracing jaw bar 56 whereby to lock jaw 119 with finger 106, lug 146 entering a recess 147 in the lower end of finger 106. Such locking action temporarily provides at the right end of the delivered line of elements a rigid wall for embracing the line endwise during the succeeding justification operation, (b) Roller 45ᵃ follows the successive lobes and valleys (clearly shown in Fig. 5) of the justification cam 45 and permits in rapid succession an up, down and up stroke of the spaceband driver 44, by its lever 45. This effects expansion of the spacebands in the line to bring the latter to the exact length desired, as predetermined by the scale settings of rider 111 and jaw 119. In justified condition the line is confined endwise between the locked finger 106 and the opposed fixed vertical wall 120 of the element displacement channel, (c) The depressed portion 47ᵃ of the justification locking cam 47 now arrives opposite roller 52 and permits rod 49 to slide forwardly under the urge of spring 51, thus to bring the locking pins 48ᵃ on bar 48 into gripping relation against vertical guide posts on which the driver 44 is mounted, Fig. 13, and so maintain the driver at its line justifying elevation, (d) A rise 55ᵇ on cam 55 now acts to rock lever 57 clockwise to lower the line embracing jaw bar 56 whereby to lower the lug 146 out of locking engagement with finger 106 and entirely clear of the path of leftward movement of the finger. As bar 56 is moved downward it depresses the plunger of a switch 121 and closes this switch, and the tapered end of a downwardly projecting pin 122 in the bar cams a pawl 123 out of locking relation with the vertical film feeding rack 124, see Figs. 1, 2, 4 and 33. In this way the rack 124 and the associated feed racks 125, 126 and 127 as well as the delivery slide and finger are released for concerted movement by the delivery lever as the elements are subsequently displaced one-by-one from the leading or left end of the line, all as hereinafter explained.

6. Shortly after the closing of switch 121 the gradual receding periphery of the second elevator cam 41 allows the elevator 40 finally to seat in its "down" position, see Fig. 2, where it closes switch 102, and upon such seating of the elevator the cam shaft is stopped by arrival at that moment of pawl 28 at its position for actuating the clutch control parts 25, 26, 27, 15 to disengage the main clutch.

7. Operation of the element displacing devices and rotary photographic shutter begins upon the closing of switch 102 (switch 121 in the circuit having been closed previously by bar 56), which action energizes the relay 103 whereby to break the circuit through the contact arm thereof which has been holding the solenoid 98 energized. Spring 99 immediately acts to advance the rotating clutch disk 76 into driving engagement with disk 77 of the displacing and photographing mechanism in the manner already described.

8. Successive spaced pairs of spring-pressed pick-up slides 128 on the opposed uni-directional driven chains 129 (later described in detail) now act, under control of tapered surfaces 130, Fig. 29, to snap over the opposed lower lugs of each succeeding line element arriving against the wall 120 of the vertical guide channel along which the elements are moved individually by the slides 128 to photographing and discharging positions. It will be remembered that the justified line of elements is held compacted and urged bodily endwise toward wall 120 by the released slide 105 and follower 106 thereon urged leftward by spring 108. And it will be understood that the spacebands are held in justified condition by the locked driver bar 44 and slide along the top of this bar as the line is advanced endwise after each removal of an element. A Geneva drive provides dwells in the movement of the chains 129 as each succeeding displaced element arrives in the photographing position where it is momentarily held and aligned on the optical axis by engagement of the pointed end of the register slide 131 in the notch K in the edge of the respective elements, see Figs. 3 and 18. After each dwell the register slide 131 is withdrawn so that the matrix then in photographing position may be elevated to discharging position at the top of the guide channel, and simultaneously the next element at the head of the line is picked up by the next oncoming pair of slides 128 and elevated into photographing position.

9. After each element is removed the remaining elements are advanced bodily a distance equal to the edgewise thickness of the displaced element. This step-by-step advancing movement is transmitted to the photographic film through the locked connection of the slide finger arm 109 to rider 111, through connection of the latter to the feed rack 125 (secured to the rider bar 113), and through the pinions and associated feed racks 124, 126, and 127, see Fig. 33. In this way the film (in a holder resting on the upper end of rack 127) advances downward by gravity after each exposure by an amount equal to or proportionate to the thickness of the displaced element for spacing of the successive reproduced letters and words in line formation across the width of the film.

10. After the last element moved against wall 120 is picked up by the slides 128, the follower finger 106 advances to the wall 120 and in so doing, the upper end of lever 61 actuates the rod 100 which operates to close the switch 101, see Figs. 19 and 28. As previously explained, the closing of switch 101 completes the circuit to the starting relay (through switch Z held closed by lug z) and the main clutch is at once thrown in to start the cam shaft 12 turning through the second part of its cycle of operation, about 210 degrees. During this time the element displacing and photographing devices are stopped and the various mechanisms are restored to their respective starting positions, as follows:

(a) After about 95 degrees of rotation from the rest position of the cam shaft as illustrated in Fig. 5ª, the rise on the second elevator cam 41 starts the elevator 40 on its upward stroke to deliver the line of elements accumulated thereon to the distributing mechanism. The element displacing and photographing devices continue to operate during part of the aforesaid 95 degree turn of the cam shaft so as to allow time for the last displaced element to be photographed and discharged onto the elevator 40. As soon as elevator 40 is started up by its cam 41, switch 102 opens to de-energize relay 103 and thus permit its contact arm to spring to position for completing the circuit through solenoid 96. Upon being energized, solenoid 96 acts to break the clutch 76—77 and thus stop operation of the displacing and photographing devices;

(b) After about 50 degrees further rotation of the cam shaft the depression 55ᶜ on cam 55 effects elevation of the line embracing jaw bar 56 from its lowest position to its normal position for stopping the next delivery stroke of line delivery slide 105;

(c) After about 35 degrees further rotation of the cam shaft roller 52 rides onto the high surface of cam 47 and effects retraction of rod 49 and the justification locks to release the driver bar 44, and after another 5 degrees of rotation the roller 45ª rides onto the large lobe of the justification cam 43 and effects lowering of the driver bar 44 to its starting position;

(d) At the end of the last 30 degrees of rotation of the cam shaft the pawl 24 operates the clutch pawls 25, 26 and forked lever 27 whereby to throw out the clutch and stop the machine. Upon stopping, the lug y on disk X closes switch Y so that the starting relay circuit may be completed as soon as switch 30 is closed by the next delivery stroke of slide 105;

(e) The flared surface of cam 58 picks up roller 59 shortly after the start of the second cycle and before the line embracing jaw is elevated by cam 55, the full leftward advance of lever 61 having disposed the roller opposite and close to the point 58ª of its cam 58, see Fig. 6. Thus, as shaft 12 starts the second part of its cycle and while lug 146 is "down" clear of the path of finger 106, the shaft 60 is rocked clockwise (as viewed from the front of the machine) and the delivery lever 61 is returned to its starting position where latch 104 engages behind block 107 to hold the lever and slide 105 until released for delivery of the next composed line.

*Line delivery devices and actions*

While the line delivery mechanism and its actions for advancing the composed line to justifying and displacing devices and for transmitting step-by-step movement to the film are the same in principle as disclosed in the pending application of Klingberg, et al., certain improvements have been made which will now be described. Thus, for reducing friction and wear to a minimum in the movements of the slide 105, said slide is supported on and guided in the usual upper and lower V-shaped tracks 132, formed in the face plate 10, by means of a pair of rollers 133 which travel on the upper track and a pair of rollers 134 which travel on the lower track, see Figs. 1, 4 and 33. During the delivery and return strokes of the slide 105 the respective pairs of rollers will, of course, revolve in opposite directions and introduce no perceptible friction or resistance to the free movement of the slide.

As best seen in Fig. 33, the delivery lever 61 is pivotally connected as usual at 135 to one end of a link 136 which is adapted to rock on a pin 137 projecting rearwardly from slide 105, pin 137 being held engaged in a notch in the link by a flat spring 138 fastened to the latter. For supporting the weight of the rider bar 113 and associated parts disposed forwardly of and movable longitudinally with slide 105 there is provided a horizontal rail 139 secured to right and left hand brackets 140 and 141 respectively, these brackets being suitably fastened to the rigid frame of the overlying housing for the spaceband mechanism, as clearly seen in Fig. 1. The right end of rider bar 113 is suspended from rail 139 by means of a bracket 142 which carries a roller 143 adapted to ride on the top surface of the rail. The left end of bar 113 is supported indirectly by the pinion 144, the toothed rack 125 which meshes with this pinion being suitably secured at opposite ends to bar 113, all as clearly indicated in Fig. 33.

The delivery slide finger 106 is formed with a depending lug 145, the left vertical face of which is adapted to stop against the right side of the inwardly projecting lug 146 at the upper end of the line embracing jaw 119, thus to stop the line delivery stroke at the line measure position for which jaw 119 is set. The left face of lug 145 forms one wall of a recess 147 formed in the end of finger 106. Lug 146 is adapted to enter into this recess when jaw 119 is elevated as hereinbefore jointed out, thus to lock the finger and jaw together and so provide a rigid right end wall against which to justify the delivered line.

As already outlined, the delivery lever 61 and its slide 105 are released upon the tripping of latch 104 by the manually raised assembling elevator 6. When so released the lever and slide move to the left under the urge of spring 108 acting to rock the shaft 60 anticlockwise, see Fig. 6. When arm 109 fully engages under the rider latch 110, the delivery stroke is stopped by simultaneous engagement of lug 145 against lug 146 on jaw 119. Bar 113 to which rider 111 is locked by detent 112, and also the film feed rack 125 attached to bar 113, are now conditioned for concurrent step-by-step movement leftward as soon as the line justifying action has been completed and jaw 119 has been lowered far enough that lug 145 on finger 106 may pass over lug 146 on jaw 119.

As previously pointed out, closing of the starting switch 30, through rocking of the switch operating arm 118 by rider latch 110, completes the starting relay circuit whereby to initiate rotation of cam shaft 12 to carry out the line embracing and justifying actions. Upon subsequent lowering of jaw 119 and stopping of the cam shaft by pawl 28, and upon starting of the element feeding chains 129 (through closing of switches 102 and 121), finger 106 and parts 113 and 125 connected to the slide 105 through the rider 111 urge the justified line leftward as each successive leading element is removed by the Geneva driven chains. The advance of the line each time by the slide and connected parts is equal to the body thickness edgewise of the removed element and this advance is transmitted to the film by the racks 124, 125, 126 and 127 and, of course, the pinions associated therewith.

After removal of the last line element the delivery lever 61 makes its final leftward advance and in so doing, its upper end encounters a bracket 101ᶜ fixed to the forward end of the horizontally slidable rod 100, see Figs. 18 and 19, and shifts said rod against its spring 100ᵃ, the adjustable screw 100ᵇ fixed to the rod then acting to depress and thereby close the contacts of switch 101, the latter being fixed to the rear of the housing for the photographing mechanism. Rod 100 is slidable in suitable lugs at the back of this housing. When lever 61 has advanced to close switch 101, the left vertical face of finger 106 will have advanced directly against the wall 120. At the same time the nose 148 of the spring pressed latch 110, which nose projects beyond the left edge of rider 111 encounters wall 120 and is thereby rocked and held tilted so that arm 109 is released from the rider 111 ready for the return stroke of the slide.

As already stated, the closing of switch 101 results in completing the starting relay circuit and consequent kicking backward of the momentarily closed armature 29ᵃ of the starting relay whereby to trip the pawl 28 and engage the cam shaft driving clutch. As the cam shaft now turns through the second part of its cycle cam 58 engages roller 59 and the consequent rocking clockwise of shaft 60 and lever 61 effects return of slide 105 to its starting position where it is engaged and held by latch 104. During the return stroke of slide 105, arm 109 of finger 106 (released from latch 110 as stated above) encounters the left vertical edge of bracket 142 which was advanced leftward along with bar 113 during the element displacing operation. When arm 109 thus picks up bracket 142, the bar 113 and connected racks 125, 124, 126 and 127 as well as the film (or the film holder resting on the upper end of rack 127) are concurrently moved back to their starting positions. It will be clear from Fig. 1 that arm 109 rests against the left edge of bracket 142 when finger 106 is held in its starting position (dot-dash lines) by latch 104. When arm 109 starts moving bar 113 on its return stroke, the nose 148 of latch 110 leaves wall 120 and the latch spring (a suitable coil spring lodged in the body portion of rider 111) at once rocks the latch to a level position where its upper edge clears and thus passes along under the switch operating bar 118 without operating this bar.

*Line embracing and justifying actions*

As hereinbefore indicated, these actions take place during the first part of the cam shaft cycle, rotation of the cam shaft 12 beginning simultaneously with the momentary closing of the starting switch 38 (by latch 110 while tilted by the delivery finger arm 109), the back-kick then imparted by the toothed wheel 32 to the momentarily closed armature 29ᵃ of the starting relay resulting in the tripping of pawl 24 and engagement of the main driving clutch. The normal or starting position of the cam shaft is best illustrated in Fig. 5 wherein the arrow indicates the direction of rotation.

Taking up first the line embracing mechanism and referring particularly to Fig. 13, the line embracing jaw bar 56 is rigidly secured to the upper ends of a pair of vertically movable posts 149 which at their lower ends are guided in a support 150 secured to the underside of the rigid frame member 151, see Fig. 2. A cross member 152 pinned to posts 149 provides for connection of the operating lever 57 in the manner illustrated in Figs. 14 and 14ᵃ. Thus, member 152 is formed with spaced lugs 153 between which is disposed a block 154 adapted to rock on a pin 155 passing through the lugs. The forward end of lever 57 is forked to straddle block 154 and to slide fore and aft thereon as the lever and block rock on their respective pivots 46 and 155. Springs 156 encircling the posts 149 serve to urge the jaw bar 56 upwardly when permitted by the contour of its controlling cam 55.

The line embracing jaw 119 may be adjusted along bar 56 to the desired line measure setting (corresponding to the setting of rider 111 and of the usual assembler slide) by means of the scale 56ᵃ and a spring pressed pawl 157 engageable in teeth 158 provided on the front of bar 56. A rigid upwardly extending arm of jaw 119 is provided with teeth 159 adapted, when bar 56 is elevated, to engage similar teeth 159ᵃ on a plate secured to the front wall of the line delivery channel 160, see Fig. 4, thus to brace the upper end of jaw 119 against the outward pressure of the line on finger 106 when the wedge spacebands are driven upwardly to expand the line endwise.

As the cam shaft starts turning, the roller 57ᵃ on lever 57 is the first to ride onto the lower contour 55ᵃ of its cam 55, under the action of springs 156, whereby to elevate jaw 119 and enter lug 146 thereon into locking engagement in recess 147 of finger 106. It will be remembered that the line delivery stroke was stopped by engagement of the finger lug 145 against the right side of jaw lug 146 so that this lug is, of course, vertically aligned for entry into recess 147.

Referring now to the line justifying mechanism, the spaceband driver 44 is rigidly secured to the upper ends of vertically movable posts 161 which at their lower ends are guided in the fixed support 150 and which pass freely through bores in the jaw bar 56. The driver operating lever 45 is pivotally connected by a link 162 to a crossbar 163 pinned to the posts 161. Springs 164 encircling posts 161 serve to urge the driver bar 44 upwardly to supply the necessary pressure for expanding the spacebands as roller 45ᵃ encounters the depressions in the contour of its controlling cam 43.

As the cam shaft turns, and immediately following the locking of lug 146 in recess 147, roller 45ᵃ drops off the initial lobe of cam 43, see Fig. 5, into the following valley, then over the succeeding lobe and onto the following concentric surface 43ᵃ of this cam. As roller 45ᵃ follows these irregularities of cam 43, lever 45 is rocked and in turn imparts two upward thrusts in rapid succession to driver 44 and against the lower ends of the wedge spacebands S overlying the driver, Figs. 2 and 16, thus expanding the line endwise against the locked finger 106 at the right and the rigid wall 120 at the left.

Figs. 1 and 15 illustrate the position and condition of the delivered line of elements when the finger lug 145 engages against the jaw lug 146 to stop the delivery stroke of slide 105. It will be noted in Fig. 15 that the elements hang loosely or somewhat separated on the rails 160ᵃ of the front and back walls of the delivery channel 160 (only the back wall and rail are shown, the front wall being removed). In Fig. 16 the line embracing jaw 119 has been elevated by its control cam 55 to lock the jaw lug 146 in the finger recess 147, and the driver 44 has been operated to drive up the spaceband wedges, the expanded or justified line now being confined tightly between finger 106 and wall 120 with roller 45ª now lying on or at least opposite to the concentric portion 43ª of its control cam 43. In Fig. 1, in particular, it will be seen that for supporting the leading (left end) matrix, which when delivered has passed beyond the left terminal of rails 160ª, there is provided on the fixed wall 120 of the vertical feed channel a lug 120ª on which the bottom edge of this matrix rests.

Immediately following the arrival of the concentric portion of cam 43 opposite to roller 45ª, the lower concentric portion 47ª of cam 47 arrives beneath roller 52, thus permitting lever 53 to rock clockwise under the urge of spring 51 and drive the justification locking rod 49 forward. This results in advance of the front ends of the locking pins 48ª on bar 48, see Figs. 5 and 13, into gripping relation with posts 161, thus to hold driver 44 in the elevated position it assumed after driving up the spaceband wedges.

The actual height to which the driver 44 is elevated under the urge of springs 164 will vary, of course, with the amount by which the length of each different delivered line of elements (as composed by the operator) falls short of the desired justified line-length, that is, the length represented by the distance between wall 120 and the finger 106 at the time the line delivery stroke is stopped by lug 146. It will also be clear that the rise of driver 44 will vary with the number of spacebands in the line and that the height to which the driver rises will determine whether roller 45ª actually rests on the low area of its cam after justification or simply stands free of such area by some variable amount.

Following this locking of the justification bar, the roller 57ª encounters rise 55ᵇ on its control cam 55. Lever 57 is now rocked clockwise whereby jaw 119 is lowered so far that lug 146 entirely clears the path of leftward movement of the depending finger lug 145, see Figs. 1 and 17. Toward the end of the lowering movement of jaw bar 56, two actions occur. The tapered end of pin 122 which projects downwardly from bar 56 rocks pawl 123 anti-clockwise, Figs. 2 and 33, against the pull of spring 165 and releases it from locking engagement in a notch 166 in the vertical feed rack 124. And about simultaneously with the full retraction of pawl 123, the spring plunger of switch 121 is depressed by the overlying and descending bar 56 so as to close this switch.

As explained under the outline of operations during a machine cycle, shortly after the lowering of bar 56, release of rack 124 from pawl 123 and closing of the switch 121, the receding contour of cam 41 allows elevator 40 to fully seat and to close switch 102, see Fig. 2. It is at this moment that the first part of the cam shaft cycle is completed by the arrival of pawl 28 at its position for effecting disengagement of the main clutch. And upon the closing of switch 102, as previously stated, the chains 129 are started and the element removing and feeding actions begin. The disposition of the several cam rollers relative to the contours of their respective cams as the cam shaft 12 stands at rest during the element removing and feeding actions is clearly illustrated in Fig. 5ª. It will be observed here that roller 41ª stands clear of the low area of its cam 41, thus to assure full seating of the elevator 40 for receiving the elements as they are successively discharged after the photographing operation.

Also as heretofore explained, after the last removed element is discharged onto the ribbed elevator bar 49, cam shaft 12 is started again. In turning through this second part of its cycle, back to the normal starting position shown in Fig. 5—and after cam 41 has raised the elevator bar 49 to the distributor and cam 58 has moved finger 106 rightward beyond jaw 119—roller 57ª rides down onto the surface 55ᶜ of cam 55. Springs 156 then act to rock lever 57 anti-clockwise and elevate jaw 119 to its starting position, see Figs. 1 and 15, where lug 146 stands ready to stop the next delivery stroke of finger 106. Next, roller 52 rides onto the high portion of cam 47 to pull rod 49 backward against spring 51 and retract the justification locking pins 48ª. And finally the riding of roller 45ª onto the high lobe of cam 43 rocks lever 45 clockwise to lower the driver bar 44, against springs 164, to its starting position as seen in Fig. 15.

*Element displacing, feeding and aligning devices and actions*

The present invention provides mechanism operating in one direction only for displacing the elements individually and successively from the leading end of the composed and justified line of elements and for progressively feeding them to the photographing and discharging stations along the vertical feed channel wall 120.

In the present instance the uni-directional feeding mechanism includes the beforementioned pair of opposed chains 129 carrying the uniformly spaced pick-up slides 128. This mechanism together with the photographic apparatus is contained in a box-like housing 167 which constitutes a unit separable from the rest of the machine. Referring to Figs. 2, 3, 4 and 35, the housing 167 is disposed adjacent to the left end of the rigid face plate 10 in which is formed the channel 160 wherein the composed line is justified. The housing rests on suitable adjustable pads 168, Fig. 2, secured in the rigid frame member 151 and is held firmly in place against the left end of the face plate 10 by parallel horizontal upper and lower rods 169. The reduced right end portion of the upper rod passes through a bore 171, Fig. 3, in a longitudinal rib along the top of housing 167 and extends into a similar bore 172 formed in a split clamp 173 at the left end of the face plate 10. The reduced right end portion of the lower rod 169 enters a bore 174, Fig. 3, in the lower end of housing 167 and toward its outer end this rod is tapped to receive a set screw 175, Fig. 35, the latter being adjustable vertically in a box at the outer end of a horn-like leftward extension 176 from the rigid frame member 151. The upper and lower rods 169 are tied together at their outer (left) ends by a spanner bar 177.

By backing out the set screw 175 and loosening the screw 178 of clamp 173, the tied-together rods 169 may be withdrawn so as to leave the housing 167 free to lift off the pads 168 whenever it is desired to remove the housing and its contained mechanisms. In the manner later described, the roll film container and adjusting mechanism therefor which is carried by rods 169, as shown in Fig. 35, and the section of bellows 179 attached to this mechanism are detachable from the adjustable lens holder 180 for the purpose of enabling the abovementioned withdrawal of rods 169.

Referring now to Figs. 2, 3, 18 and 24 to 27 inclusive, the right wall of the housing 167 is constituted by inner and outer plates 181 and 182 respectively, these plates being secured together as by two screws 181a and being secured to the housing by four screws 183, Fig. 3. As shown in Figs. 24 and 25, plate 181 is provided with four clearance holes 184 and plate 182 with four correspondingly located tapped holes 185 to accommodate the securing screws 183. The rigid vertical wall 120 of the element displacing channel, hereinbefore referred to, is constituted by the face of plate 181 which is opposed to plate 182 when the two plates are assembled together and to the housing 167 by screws 183.

Between the assembled plates 181 and 182 is located the aforesaid element displacing channel generally designated 186 in Figs. 1, 2, 26 and 29. This channel is formed by the wall 120 of plate 181 and vertical grooves 187 cut into the face of plate 182 to a depth slightly more than the edgewise thickness of the lugs on the line elements or matrices M. As best seen in Figs. 2 and 26, the channel extends upwardly from the justification channel rails 160a to a level for discharging the line elements onto the ribbed bar of the second elevator 40. Plate 182 is provided with an elongated opening 188 which is enlarged at 188a to the over-all width of an element, thus to admit the leading element of an assembled line past plate 182 into the bottom end of the feed channel and against wall 120. The upper end of the opening 188 is enlarged at 189 and 190 to clear the upper and lower lugs of the elements as they are pushed laterally out of the top of channel 186 onto the ribbed bar 40 as later explained.

To the same depth as the grooves 187 there is formed in plate 182 symmetrical sets of grooves 191 which register with slots 192 through the plate 181 when the two plates 181 and 182 are assembled face to face as shown in Fig. 24. The slots 192 are formed by the profile of elongated pieces 193 punched out of plate 181 on the line 194, the pieces 193 being reduced in outline after being punched out and then secured by screws 195 to plate 182. The slots 192 superimposed over the grooves 191 when plates 181 and 182 are assembled form guideways for the element engaging pick-up slides 128 on the opposed chains 129 as best seen in Figs. 18 and 29.

Thus, when the chains 129 are driven in the direction of the arrows in Figs. 3 and 29, the slides 128 are forced, by their springs 196 through slots 192 and into grooves 191, and said slides are caused to retreat out of grooves 191 by the inclined surfaces 139 (inclined from the depth of grooves 191 to the wall 120 as they approach the element pick-up position) in order to clear the lower lugs of the leading line element pressed against wall 120. By the time the recesses 197 formed in the front ends of an opposed on-coming pair of slides 128 arrive opposite the lower lugs of a leading line element, the bottom edges of the respective slides arrive at the level of the shoulders 188b at the bottom of the enlarged opening 188a, Figs. 25 and 29, the inclines 139 terminating somewhat below these shoulders. The slides are now free to snap inwardly, under the urge of their springs 196, whereupon the opposed lower lugs of the leading line element become engaged in the recess 197 of the corresponding slides for movement upwardly of such element along the feed channel 186. It will be clear from Figs. 26 and 29 that the rails 160a of the channel 160 extend through the opening 188a in plate 182 and terminate clear of the wall 120 by the depth of the grooves 187. A fixed pair of lugs 129a, Figs. 24, 26 and 29 is provided on plate 181 to support in the feed channel 186 the leading line element pressed leftward against wall 120 beyond the termination of rails 160a during justification when the chains are idle, and likewise to support each successive leading element until the arrival of a pair of pick-up slides when the chains are in operation. It will also be clear that the slides 128 on the opposed chains are arranged to arrive in pairs opposite the element to be engaged and to effect such engagement by springing over the lower lugs of the element in a direction normal to the flat or broad side face of the element.

Plate 182 is provided with a recess 198 in which operates the reciprocable register bar 131 hereinbefore alluded to, this bar serving to accurately locate the elements, successively moved upwardly by slides 128, on the optical axis during the photographic reproducing operation, all as hereinafter explained.

The respective chains 129 pass over upper and lower sprockets and also over idler sprockets midway between, as clearly shown in Fig. 3. The upper sprockets 199 are mounted on shoulder screws 200 which enter the tapped holes 201 in plate 181, see also Figs. 24 and 27. The idler sprockets 202 are mounted on shoulder screws 203 which enter the tapped holes 204 in plate 181. The lower sprockets 205 are pinned to short shafts 206 and 207 which respectively are rotatable in similar fixed bosses 208, see Figs. 2 and 32, and in ball bearings 209 in the pieces 193 secured to plate 182, see Fig. 24. To shaft 206 is pinned a spur gear 210 which meshes with a similar gear 211 on shaft 207. Shaft 206 is driven through the medium of a Geneva drive, shortly to be described, and the resulting intermittent motion is transmitted to the two chains through the meshing gears 210, 211.

As pointed out earlier in this specification, the element displacing and feeding chains are driven intermittently through a Geneva type of drive in order to provide the required dwells for the successive photographic exposures. The power for this drive and also for the rotary photographic shutter is taken from the vertical shaft 81 which is driven from the disk clutch 76, 77, this clutch, when engaged, turning shaft 78 and transmitting the drive to shaft 81 through the meshing gears 79, 80, see Figs. 2, 3, 6, 28 and 31.

Referring now to Figs. 2, 3, 18 and 31, the shaft 81 carries the driver 212 for the Geneva wheel 213. As usual for the Geneva type of intermittent drive, the driver 212 is constituted by an eccentric (pinned to shaft 81) carrying a roller 214 and having a hub 215. The wheel 213 is constituted by a disk having similar channels 216 cut across one face at right angles to one another and intersecting at the axis of the disk, and having arcs 217 formed in its outer rim between the mouths of the channels 216, the arcs 217 being adapted to snugly fit against the hub 215 of the driver and maintain the wheel intermittently at rest relative to the driver. The wheel 213 is turned a quarter turn for each full turn of the driver, roller 214 entering one of the quarter channels 216 and tracking on one side wall thereof to enforce rotation of the wheel. As the roller approaches the center of the wheel it turns the latter with increasing speed and then starts retracking against the same side wall of the same quarter channel, meanwhile turning the wheel at a gradually decreasing speed until the roller finally emerges out of the channel. By this time the wheel has been rotated ninety degrees and comes to rest while the driver continues to rotate to the point of entering, then retreating out of the next adjacent quarter channel. The hub 215 of the eccentric driver 212 is provided with an arcuate cut 218 to clear the blades of the Geneva wheel as it is turned on its axis by the roller 214.

The Geneva wheel 213 is pinned to the upper end of a vertical shaft 219 to which shaft is also pinned a bevel gear 220 for driving the companion gear 221 (pinned to the inner end of shaft 206) and in turn imparting the intermittent drive to the chains 129. The opposed parallel runs of the chains 129 move upwardly as indicated by the arrow in Fig. 3 when they are in operation, it being remembered that they start in response to release of the line-follower finger 106 from the line embracing jaw 119 and closing of switch 121 by said jaw when moved to releasing position, and the chains operate only for a limited period determined by the number of elements in the composed line. At each dwell of the chains during their operation the bar 131 is operated in order to enter the notch to align the displaced element for the photographic exposure while said element remains engaged with the pair of slides 128 by which it was elevated.

For operating the register bar 131 (and other devices as later described) there is provided on the vertical shaft 81 an egg-shaped cam 222 adapted to cooperate with a roller 224 at the free end of a rocker arm 223 which is pinned to the lower end of a vertical shaft 225, Fig. 3, this shaft being adapted to oscillate in suitable bearing lugs 226 projecting from a vertical web 226ª in the housing 167, see Figs. 3 and 31. For oscillating shaft 225 in response to cam 222 there is provided about midway of the length of the shaft a toothed segment 227, Figs. 3 and 18, pinned to the shaft and meshing with a toothed rocker 228 pivotally mounted on a bracket 229 secured to the web 226ª, see Figs. 18 and 32. The free end of rocker 228 is provided with a roller 230 against which rests, under the tension of a spring 231, a stud 232 secured in the register bar 131. Stud 232 projects through an opening 233 in the assembled plates 181, 182 and spring 231 is fastened at one end to a pin in the stud and at the other end to a pin 234 in the plate 182 as clearly shown in Fig. 18. A coil spring 235 encircling shaft 225, Figs. 3 and 31, is secured at one end in the lower bearing lug 226 and its other end in a collar 236 on the shaft and this spring urges the shaft in a clockwise direction, thus opposing spring 231 and keeping roller 214 firmly against the periphery of its operating cam 222.

It will now be evident that as the chains 129 are driven, an opposed pair of pick-up slides 128 are cammed back as their vertical front edges ride up the respective cooperating inclined surfaces 130, see Figs. 25 and 29. Upon arrival of the recess 197 in the respective slides opposite the corresponding lower lugs of the element at the head of the justified line of elements, the slides snap over said lugs and immediately elevate the element in the feed channel 186. Due to the timing of the Geneva wheel 213 and of the cam 222, the chains stop just as the notch K in the element arrives opposite to the pointed end of the register bar 131 and at this moment cam 222 swings arm 223 anticlockwise which in turn swings the toothed rocker 228 clockwise. This releases the register bar for sliding leftward as viewed in Fig. 18 under the pull of its spring 231 whereupon the pointed end of the bar enters notch K to positively align the element during its brief period of dwell at the photographing position.

Cam 222 continues to rotate with the constantly turning shaft 81, the chains, however, remaining idle while the hub 215 of the Geneva driver rides in the particular arc 217 in the outer rim of the Geneva wheel.

By the time roller 214 of the driver enters the next quarter channel 216 in the Geneva wheel, cam 222 will have turned far enough to bring roller 224 on rocker arm 223 onto the low concentric portion of the cam so that the register bar 131 will have been retracted, this condition being clearly illustrated in Fig. 18. Accordingly, as the Geneva drive again starts the chains, the photographed element will be free to be elevated further along the feed channel. Meanwhile, the next element at the head of the line (pressed against wall 120 by the leftward advance of the remaining elements along rails 160ª after each displacement of an element) will be elevated from its resting place on lugs 120ª to the photographic position by the next opposed pair of slides 128, such pair of slides having snapped over the lower lugs of said next element at the time the chains stopped for the exposure of the previously raised element. At the end of the instant quarter turn of the Geneva wheel the chains will stop again and cam 222 will release the register slide for aligning said next element for photographic exposure.

The construction and sliding action of the element pick-up slides 128 will be clear from Figs. 29 and 30. Thus, at evenly spaced intervals the chains 129 are provided with special links 129ª having upper and lower lugs which are channeled on their opposed inner faces to accommodate the slide members 128. Springs 196 fastened to a lug on the slide members and to a pin 196ª in the special links 129ª act to urge the slides into the element feed channel 186. The inclined surfaces 130, Figs. 24 and 29, act to cam an opposed pair of slides backwardly against springs 196 as such slides approach the lower lugs of the leading line element resting on lug 120ª in the feed channel.

The details of the pick-up element slides herein disclosed are being claimed in a copending application filed on even date herewith by Willard S. Curtis.

It will be apparent that the speed of rotation of shaft 81 determines the rapidity with which the successive steps of displacing, registering and photographing take place, the movement of an element by the chains from the level of rails 160ª to the optical axis being accomplished during 90 degrees of rotation of shaft 81 and the registering action, according to the instant arrangement, being completed within the following 45 degrees of rotation, thus leaving an ample period of 225 degrees for the photographing operation and retraction of the register bar. Since the registering action could obviously take place as soon as the chains stop (after the 90 degree turn of the Geneva wheel by the corresponding rotation of shaft 81) a double arm Geneva driver having two rollers, spaced 180 degrees apart, may be employed, if desired. In such case, two element displacing and photographing actions may be attained for each full turn of shaft 81 without increasing the actual speed of movement of the chains or the elements.

Element discharging devices

Upon arrival of each element at the top of the feed channel 186 it is discharged laterally, to the right as viewed in Fig. 2, onto the ribbed second elevator bar 40 by the following mechanism. To the upper end of the oscillating shaft 225 is pinned an operating arm 237 for a pusher 238 adapted to reciprocate laterally through the feed channel 186 in response to the oscillations of shaft 225. The pusher 238 is fast to the end of a rod 239 which is slidable in a bracket 240 and a hole 241 in plate 181, see Figs. 2, 24 and 26. Secured to rod 239 is a block 242 which is recessed across its upper and lower sides to receive pins 243 projecting inwardly from the opposite sides of the forked free end of arm 237, all as clearly illustrated in Figs. 2, 3, 31 and 32. The pusher operating arm is oscillated by cam 222 and as the arm swings and reciprocates the pusher pins 243 slide in the recesses in block 242. The tension of spring 235 encircling shaft 225 is increased due to the winding action induced each time cam 222 rocks shaft 225 anticlockwise for the element discharging stroke of pusher 238 through the upper end of the opening 188 in plate 182. Accordingly, the unwinding action of spring 235 urges shaft 225 clockwise for the retreating stroke of the pusher (and also of the register bar 131) as the low concentric portion of cam 222 comes around beneath roller 224. As previously pointed out, the enlarged portions 189, 190 of the opening 188 in plate 182 provide clearance for the passage of the lower and upper lugs on the elements as the latter are discharged by the pusher 238.

Each spaceband arriving at the top of the feed channel 186 is also discharged by the pusher 238, but being devoid of teeth for engaging the ribs of the second elevator bar the spacebands simply hang by gravity (by their lower lugs) on rails from which they drop by gravity at the end of the stroke of the pusher for distribution to their storage box G, all in a manner hereinafter described.

Photographic shutters

The main photographic shutter comprises a rotary disk 244 having an aperture 245. Whenever the clutch 76, 77 is engaged, this shutter is driven from the vertical shaft 81 at a constant speed in the direction indicated by the arrows in Figs. 31 and 32. Thus, to the upper end of shaft 81 is secured a miter gear 246 which meshes with a companion gear 247 on the inner end of a short shaft supported for rotation in a bearing 248 formed on one of the lower forwardly projecting arms of a bracket 249, see Figs. 2, 3 and 18. Bracket 249, which is mounted within the housing 167 and secured to the back wall thereof as by four screws 250, Fig. 2, has two upper and two lower arms 251. To the side face of the right hand upper and lower arms 251 as viewed in Fig. 2 is secured a flat plate 252. On a shoulder screw 253 in plate 252 is mounted a sprocket 254 to the hub of which is fastened the disk shutter 244. A chain 255 over sprocket 254 and a similar sprocket 256 on the same shaft with gear 247 serves to drive the shutter from shaft 81.

The timing of the shutter 244 is, of course, such that its aperture 245 will cross the optical axis during each momentary dwell in the movement of the chains 129, thus to effect the exposure of the character element then aligned on the optical axis by the register bar 131. And the plates 181 and 252 are, of course, provided with fixed apertures at the level of the optical axis, plate 181 having the aperture 257, Figs. 3, 24 and 26, and plate 252 having the aperture 258 as clearly shown in Figs. 20, 21, 22 and 31. Light from a source L in front of a suitable reflector, see Figs. 1, 2 and 4, passes through a condenser lens (not shown, but of well known form) and thence through the character plaque of the element aligned on the optical axis for exposure.

Auxiliary safety shutter means is provided for the purpose of clearing the fixed aperture 258 for the successive photographic exposures only during the period between arrival of the first character element on the optical axis and removal therefrom of the last line element. Such auxiliary shutter means also includes devices for blocking off the aperture 258 under certain special or unusual conditions as will later appear. As best seen in Figs. 18, 20, 21, 22, 23, 31 and 32, the auxiliary shutter means comprises opposed slides 259 and 260 which are slidable in a dovetail recess extending horizontally across the front face of plate 252. The opposed inner ends of these slides have complementary recesses whereby they overlap when in positions for blocking off the aperture 258, see Figs. 20 and 22.

Slides 259 and 260 occupy the aperture closing position indicated in Fig. 20 until the element displacing and photographing devices are started by engagement of the disk clutch 76, 77 whereupon movement upwardly of the first line element operates slide 259 to uncover the aperture 258. This is accomplished through the medium of a rocker 261 swingable on a pivot pin in a fixed bracket 262 secured to the plate 252 as clearly indicated in Figs. 18, 31 and 32. The outer end of rocker 261 is formed with a relatively thin tongue extending forwardly into the element feed channel 186 and thus in the path of the V-shaped tooth notch of the leading line element resting on lug 129a, Figs. 1 and 29, in the feed channel. The inner end of rocker 261 rests freely on top of a lug 263a, Figs. 31, 32 and 23, on an operating lever 263 pivoted at 264 on plate 252 and having a cam slot 265 formed in its upwardly extending arm. The cam slot 265 embraces a shouldered screw 266 secured in the shutter slide 259 and a spring 267 hooked over a pin in lever 263 and a pin in plate 252 acts normally to keep the lower end of the cam slot against screw 266. In this position of lever 263 aperture 258 is closed or covered by the slide 259 as indicated in Fig. 20.

As the leading line element is displaced upwardly by the chains, the vertex of the V-notch in the top of such element encounters the tongue on rocker 261 and swings the latter on its pivot. As a result, lever 263 is rocked anti-clockwise against the action of spring 267, and the camming action of slot 265 on screw 266 moves the shutter slide 259 leftward to the position shown in Fig. 21, the fixed aperture 258 thus being uncovered. Once opened in this manner by the first element displaced from a given line, the shutter slide 259 is retained open until the last line element is elevated from the photographing position. For this purpose there is provided a latch 268 secured to the inner end of a sleeve 269, Fig. 32, to which sleeve at the outer end is secured an operating finger 270. This assembly is pivotally mounted on a shoulder screw 271 in plate 252 and is urged clockwise by a spring 272. When slide 259 is cammed to open position by lever 263, see Fig. 23, a pin 273 in the slide rides off the top edge of the free end of latch 268 and becomes disposed against the front end of the latch as the latter swings clockwise under the urge of its spring 272. The shutter slide 259 is thus held open against the urge of its spring 267. A pin 274 limits the upward swing of latch 268 by its spring 272.

After the last line element is moved upwardly from the photographing position, latch 268 is operated by the register bar 131 to release the shutter slide 259 for closing. This is accomplished by means of a small roller 275 carried on a pin secured in the register bar 131 and as best seen in Figs. 18 and 32, roller 275 is disposed in the path of the operating finger 270 for the shutter latch 268. As previously explained, the reciprocations of the register bar 131 into and out of the element feeding channel 166 are controlled by the cam 222 on shaft 81. The form of cam 222 is such as to allow an overmotion leftward of bar 131 (under the urge of its spring 231) beyond the limited stroke it can make when its pointed end encounters an element disposed on the optical axis. Thus, after the last element is raised from photographing position in the feed channel—and for that matter at any time in the absence of an element on the optical axis—the overmotion of bar 131 allows roller 275 to contact with and to rock the finger 270 and latch 268 anti-clockwise. As soon as the latch swings clear of the holding pin 273, spring 267 urges lever 263 clockwise and the cam slot 265 then shifts the shutter slide 259 to the right for closing the aperture 258. The Geneva drive then continues to operate the feed chains the few additional times necessary to feed the last raised element to the top of the feed channel for discharge laterally therefrom by the pusher 238.

From the foregoing it will be evident that the auxiliary shutter slide 259 is opened by the first element fed from the composed line into photographing position and that this shutter is automatically released by the register bar 131 for closing when the last element of the line is fed from the photographing position. And it will also be understood that at any time in the absence of an element at the photographing position the overmotion of bar 131 will trip the latch 268 so that shutter slide 259 may close.

As hereinbefore explained, the main cam shaft 12 is started (through the closing of switch 101 by the final advance leftward of the line follower 106 when the last line element is removed) before the last removed and photographed element is discharged onto the second elevator bar 40. However, ample time is allowed for such discharge to be completed before the second elevator is started upward, it being clear that when the cam shaft starts from its intermediate rest position indicated in Fig. 5ª the elevator cam 41 must turn clockwise some ninety-five degrees before engaging the roller 41ª of the elevator operating lever 42.

It may be pointed out here that the shutter slide 259 is also operated in the manner described in conjunction with the operation of the auxiliary shutter slide 260. The slide 259 is, in effect, an automatic safety shutter for controlling the opening and closing of the optical axis (aperture 258) during circulation of each line of elements to be reproduced. The slide 260, however, is auxiliary to slide 259 and is manually released for closing the optical axis but automatically restored to its manual open position. The slide 260 is used whenever it is desired to circulate a composed line of elements through the machine without photographing them, i. e., to blank out the sensitized surface while disposing of an unwanted line of elements. The specific conditions of its use for enabling the blanking-out of a line will be described in detail later on under a separate heading.

*Film holder and film cases*

Referring now to Figs. 35 to 43, the film holder comprises the vertically disposed and relatively thin back plate 276, Figs. 36 and 39, from the front of which projects the upper and lower irregularly shaped plates 277, the opposed faces of the latter plates being grooved as at 278, Fig. 39, to accommodate a thin cover plate 279, Fig. 35. On the rear of the back plate 276 is secured upper and lower sets of rollers 280 adapted to run in grooves 281 formed in the vertical edges of a long upright plate 282 which supports and guides the film holder as it travels step-by-step downward for the successive photographic exposures and upward after completion of each line. To a downward projection of the back plate 276 is secured a bracket 283 which carries an adjustable screw 284 adapted to rest upon and thus sustain the film holder against the upper end of the vertical feed control rack 127 as clearly shown in Figs. 35 and 36. The guide plate 282 is provided with a fixed aperture 285 which may be square as indicated in Fig. 36 and which is, of course, constantly aligned on the optical axis, and the back plate 276 of the film holder is provided with the elongated aperture 286. As the rack 127 moves step-by-step downwardly in response to the removal successively of the line elements and the consequent action of the line follower on the connected train of gears and racks including the rack 127, see Fig. 33, the film holder gravitates in corresponding steps for the successive photographic exposures through the fixed aperture 285.

The opposed outer vertical edges of the film holder are arranged to removably sustain the film cases 287 and 288, the former case containing a supply roll of film and the latter being adapted to receive the exposed film in a free winding roll as it is fed thereto. The respective film cases are held in place by similar clamp arrangements comprising the vertical rods 289 suitably journaled in the upper and lower plates 277 and having pinned thereto adjacent to the inner sides of the respective plates the cam collars 290, see Figs. 36, 41 and 44. On the lower ends of rods 289 which extend beyond the lower plate 277 there is provided the finger levers 291 for manually turning the rods 289 to clamping and releasing positions. Cooperating with the upper and lower collars 290 are pins 292 adapted to float freely in bores through suitable strips 293 and having enlarged heads which are urged against flats on the respective collars by flat springs 294, the latter being forked to embrace the pins.

Pivoted on vertical shafts 295 within each film case is a similar assembly of parts for releasably locking the cases to the body portion of the film holder. The arrangement herein provided for this purpose is illustrated in Fig. 44 in connection only with the receiving film case 288. The locking assembly includes a vertically elongated strip 296, 296ª formed as shown and made of springy material and fastened as by rivets to a flat elongated strip 297. Both strips 296 and 297 are faced with felt or the like as indicated for the purpose of excluding light from the case 288.

The locking action is accomplished by a vertically disposed offset member 298 secured along the edges of plate 297, the offset lip portion of this member being adapted to enter into locking engagement with the groove 299 (formed by strips secured to the film holder back plate 276) whenever the cam collars 290 are turned to drive the floating pins 292 inwardly against the action of the flat springs 294. When member 298 is thus pressed into locking position the entire assembly, including plates 296 and 297, rocks slightly on the shaft 295 and provides a slight opening between the felt facing on strip 297 and the opposed inner face of the film case for the free movement of film therethrough as it is fed into the receiver case 288. It will be apparent that the rocking movement just referred to causes the felt faced arm of strip 296 to yield and press the felt firmly against the outer wall of the case.

When the lock 298 is released (by turning the finger lever 291 to the position shown in Fig. 44) for the purpose of removing the receiving case 288 as will shortly be explained, the yielding pressure of the springy strip 296 against the outer wall of the case acts to rock the assembly counterclockwise about the shaft 295 and to thus spring the felt facing on strip 297 into firm gripping contact with the film between it and the opposed inner wall of the case 288, as here shown. The felt facing on strip 296, however, remains in firm although slightly relaxed contact with the outer wall of the case.

In passing from the supply film case 287 to the receiving or exposed film case 288 the film passes first over suitable idler rolls 300, then over feed rolls 301, the latter rolls being faced with suitable material such as rubber in order to provide traction for advancing the film. As will be apparent from Figs. 36 and 39, the idler and feed rolls respectively are carried on vertical shafts 300ª and 301ª journaled at opposite ends in the upper and lower plates 277, the upper ends of these shafts being provided with knobs 302 and 303 for turning them manually. Thus, to initially charge the film holder a portion of film sufficient to reach the rolls 300 is drawn out of the detached supply film case 287 and tucked into the vertical open edge of the holder. The supply case is then inserted and locked in place by operating the lock members 298 for this case. Assuming that the film receiving case is also locked in place, the knob 302 is now turned by hand until the film encounters the rolls 301, whereupon the knob 303 is turned sufficiently to advance the portion of film initially drawn out of the supply case (an exposed end of which is of course wasted) beyond the range of the exposure apertures.

Upon release of the lock 298 in the manner already described, the case 288 may be withdrawn edgewise from engagement with the body portion of the holder, and as it is so withdrawn the grip of the felt on strip 297 against the film is sufficient to prevent slippage of the latter and to enable drawing it through the holder from the supply case until enough is exposed to cut it off.

It will be understood, of course, that before so removing the receiving case 288 it is necessary to turn the feed rolls 301 by hand (by means of knob 303) in order that the last line photographed on the film will be fed within the case, in other words the exposed portion of the film must be advanced by hand into the receiving case 288 before removal of the latter in order to protect it from exposure to light during the removal operation.

It will also be understood that a short stretch of film will be wasted each time the receiving case is removed. This, however, is of minor consequence as compared to the advantages derived from being able to detach the receiving case at any time. Thus, instead of requiring that the entire supply of film be exposed before it is available for developing, the arrangement herein provided enables immediate removal of any portion of exposed film containing a wanted line or part of a piece of composition. All that is necessary is to remove the receiving case, cut off the film and take it to the dark room. Meanwhile another receiver may be locked to the holder for continued operation of the machine. The value of this facility from the standpoints of time saving, convenience and general efficiency will be obvious to anyone familiar with procedure in the production of printed matter.

*Film exhaustion signal*

As shown in Figs. 40 and 41, an electric signal arrangement is provided for indicating exhaustion of the supply of film. For this purpose there is provided a metal roller 304 carried by an insulated strip 304ª secured to the film guide plate 308 and wired to an insulated terminal post 305. When no film is present between roller 304 and a short grounded shaft 306 (rotatably mounted within the film holder on small bearing brackets as indicated) an electric circuit is completed through a signal such as a light 307 visible to the operator from the front of the machine, see Fig. 2. It will be observed from Fig. 41 that film entering the holder from the supply case 287 passes between the signal control rollers 304 and 306 in its course along the surface of the inclined guide plate 308 which deflects the film toward the rolls 300. As usual in cameras, the guide plate 308 extends across the film holder to hold the film flat over the exposure area between the feed rolls and against a liner plate 309 secured to the back plate 276 of the film holder.

*Film feed for line spacing*

The long vertical plate 282 on which the film holder moves downwardly for the successive letter-by-letter exposures and upwardly after completion of a line is sustained on the parallel upper and lower rods 169. This plate is adjustable on these rods toward and away from the housing 167 for focusing purposes when it is desired to produce images in enlarged or reduced sizes as will later be seen. For sustaining the plate 282 on rods 169 the plate is suitably secured at its upper end to a bracket such as a casting 310, see Figs. 35 and 36. A boss 311 of this casting is bored to slidably fit the rod 169. At its lower end the plate 282 is secured to a cast bracket 312, see Figs. 36 and 43, which is bored to slidably fit the lower rod 169.

On the bracket 312 is mounted an upright support 313 having a bearing at its upper end in which is held, by means of a pilot screw 314, a short rock shaft 315, the latter being annularly grooved to enable it to rock as required. Secured to shaft 315 is a built-up assembly of parts which operate a line-space rack shortly to be described. The assembly of parts referred to includes a depending arm 316 carrying a roller 317 at its free end, and an upwardly extending arm 318. The arms 316 and 318 are spaced apart on shaft 315 by spacer rings (best shown in Fig. 37) to which the arms are suitably united as by rivets so that the arms, rings and shaft may rock as a unit in the shaft bearing of support 313.

Pinned to one end of a shaft 319, which shaft is free to turn in a bearing formed in the support 313, is a cam 320 adapted to cooperate with roller 317. To the other end of shaft 319 is pinned a dial 321 having notches numbered according to the desired point-size of the printing characters being produced. A spring detent 322 is provided on the support 313 for locking the dial 321 in selected position. When the dial is turned manually the cam 320 turns with it and in consequence the arms 316, 318 are rocked in unison through the action of the cam on roller 317, it being noted that a spring 322ª fastened at one end to arm 316 and at the other end to the support 313 constantly urges roller 317 against the cam 320.

It will now be evident that the setting of dial 321 determines the angular disposition of the right hand edge 323 as seen in Fig. 36 of the arm 318, that is, the angular relation of the edge 323 to the co-extensive and fixed vertical edge 324 of a track plate 325 secured to the support 313. It is this relation that effects operation of the line-space rack and clutch referred to above whereby to control the extent of line-space feeding of the film.

As best seen in Figs. 36 and 39, the film space rack 326 is disposed at the underside of the lower plate 277 of the film holder. The rack is supported for horizontal reciprocation in a bracket 327 and a groove formed in a cover 328 in a counterbore of which is contained a gear 329 meshing with the rack and free to turn on the lower end of a vertical drive shaft 330, the latter being journaled in bearings in the upper and lower plates 277. A spring 331 hooked to the left end of the rack and to a pin in the lower plate 277 constantly urges the rack leftward as viewed in Figs. 36 and 39. On a shoulder screw in a small block secured to rack 326 is a roller 332 which is adapted to track along the edge 323 of the angularly adjustable arm 318 and the co-extensive but fixed vertical edge 324 of the track plate 325. As indicated in Fig. 38, the gear 329 is pinned to the clutch member 333 which latter is contained within the clutch ring 334 pinned to the lower end of shaft 330. Clutch member 333 is provided annularly with a series of similar flats and pockets in which latter are contained coil spring seats for the clutch balls 335.

With the foregoing construction in mind, it will be seen that as the film holder moves step-by-step downwardly for the successive photographic exposures the travel of roller 332 along the angularly disposed edge 323 of arm 318 results in intermittent leftward displacement of rack 326 under the urge of its spring 331 and that such movement of the rack ceases during the travel of the roller along the co-extensive vertical edge 324 of the track plate 325. As the rack moves leftward the gear 329 in mesh with the rack and the clutch member 333 pinned to said gear are turned clockwise and idly relative to the clutch ring 334, the clutch balls 335 merely rolling freely over the smooth inner wall of the clutch ring 334. However, upon the return upwardly of the film holder to starting position for the next line (due to the upward movement transmitted to rack 127 through the train of racks and gears operated by the line delivery lever upon the return stroke of the latter) roller 332 first back-tracks along the vertical edge 324 and then along the angular edge 323 of arm 318 which latter edge gradually forces the line-space feed rack 326 to the right against spring 331 a total distance determined by the angular setting of arm 318. This distance is equal, of course, to the leftward displacement of the rack during the downward travel of the film holder. The forcing of rack 326 to the right results in anti-clockwise rotation of the clutch ring 334 and the drive shaft 330 to which the ring is pinned, the flats formed on clutch member 33 acting to cramp the clutch balls 335 toward their spring seats and into driving engagement with the inner wall of the clutch ring.

Rotation of the line-space clutch as just described, during the upward or return movement of the film holder, is transmitted to the film feed rolls 301 on shaft 301ª through the medium of a gear 336 fixed to the upper end of shaft 330 and a mating gear 337 fixed to the upper end of shaft 301ª. In this way the film is advanced after completion of each line a distance suitable to the point-size of the type being produced and governed by the setting of the dial 321. Obviously, the arm 318 will be disposed by the cam 320 at a greater angle for larger point-size (height) characters as indicated on the dial in order to correspondingly increase the extent of leftward displacement of the line-space rack and its subsequent feed stroke to the right. And conversely, for smaller point-size settings of the dial, the arm 318 will be disposed more nearly vertical and effect a correspondingly less displacement to the left and feed stroke to the right of the line-space feed rack. It should be understood, however, that the dial may be set to provide any desired amount of line spacing movement of the film beyond that required by the particular point size of the type being produced; thus to attain the effect of "leading" or wide spacing between lines as frequently practiced in the production of printed matter.

*Enlarging and reducing, focusing and letter-space feed adjustments*

As well understood by those familiar with commercial typographical machines there may be one or more magazines I available, each magazine containing a different font of matrices—different as to the style or the point size of the type face carried by the matrices. This is true also for the present machine except for the fact that the photographic reproducing devices enable the production of matter in a number of different point sizes from a single size or "master" font of matrices. Thus, the present machine may be equipped with one or more magazines and "master" fonts alike or differing as to point size and design of the type face, according to such requirements as may arise.

For the sake of simplicity the present description will be limited to the condition that one magazine is present on the machine and contains a "master" font of matrices of 12-point size. Thus, the matter reproduced photographically on the basis of a one-to-one ratio will be 12-point matter and for larger or smaller reproductions the operator will be required to make adjustments for focusing, for extent of line-space feed of the film, and for extent of letter-by-letter feeding of the film holder for the successive exposures as well as for speed of drive of the element displacing chains and photographic shutter.

For focusing purposes when enlarging or reducing the long upright plate 282 which supports and guides the film holder is adjustable toward and away from the fixed photographing position at which the elements to be reproduced are presented. For adjusting the film holder, the upper and lower cast brackets 310 and 312 respectively to which the plate 282 is secured may be moved in unison along their respective supporting rods 169 by turning the knob 338 fastened to a shaft 339 carried in bearings in the upper bracket 310. A bevel gear 340 on the inner end of shaft 339 meshes with a similar gear 341 at the upper end of a vertical shaft 342 which is supported for rotation in suitable bearings in the upper and lower brackets 310 and 312. As best seen in Fig. 36, there is pinned to shaft 342 near its upper end a spur gear 343 meshing with a toothed rack 344 secured in a groove or spline in the upper rod 169, and pinned to the lower end of this shaft is a spur gear 345 which meshes with a similar toothed rack 346 secured in the lower rod 169, see also Fig. 43.

With this construction it will be seen that when the vertical shaft 342 is turned in response to manipulation of knob 338 the upper and lower brackets 310 and 312 in which this shaft is carried are moved in unison along rods 169 through the medium of the spur gears on the shaft and the fixed racks on the rods. The flexible bellows 179 secured to the film holder supporting plate 282, Figs. 2 and 35, permit this focusing adjustment of the film holder relative to the objective in the lens holder 180.

The adjustment of arms 316, 318 by dial 321 for varying the line-space feeding of the film to suit different point-sizes of type that may be produced by enlarging or reducing was described under the previous heading. Earlier in this specification the arrangement for correspondingly varying the speed of drive of the element feeding chains and the rotary shutter 244 was discussed, the adjustment for this purpose being controlled by the setting of handle 70 to the desired point-size indicated on disk 83. It now remains to explain the mechanism for varying the extent of advance of the film holder downwardly for the successive letter-by-letter exposures when producing images in enlarged or reduced sizes from a "master" font of elements of a given point size.

It will be recalled that the film holder rests on the upper end of the vertical feed rack 127 which is moved downwardly step-by-step in response to the line advancing action of the line follower 106 by the line delivery lever 61 after each displacement of an element from the composed line of elements, being transmitted to rack 127 through the train of racks 124, 125, 126 and associated pinions, and the extent of the advances being basically controlled by the variant body thicknesses of the respectively displaced elements. As best seen in Figs. 35 and 36, rack 127 is supported and guided vertically toward its lower end between one arm of an angle bracket 127ᵃ secured to bracket 312 and a small roller 127ᵇ on the angle bracket. Somewhat above bracket 127ᵃ, rod 127 passes through a closely fitting slot cut in a rib portion 312ᵃ of bracket 312.

In the present embodiment means is provided for varying the extent of the step-by-step movements of rack 127 relative to the successive advances of the line follower which drives it so that 12-point master letters, for example, may be properly spaced apart when reproduced in one-half size or full size or when enlarged in a two, three, four, five or six to one ratio.

For this purpose the cast bracket 312 at the lower end of plate 282 includes a gear box 349 with a cover 348. Contained in this gear box on a fore and aft shiftable shaft 350 is an elongated pinion 347 rotatable on said shaft; an idler gear 351 carried in a yoke member 352 shiftable together with the aforesaid shaft and pinion, and a cluster of gears 353, 354, 355, 356 and 357 relative to which the idler gear 351 may be adjusted to selectively alter the driving ratio between the horizontal rack 126 and the vertical rack 127.

Shaft 350 is journaled at its inner end in a bore through a wing portion of bracket 312 and extends forwardly through a hollow sleeve 366 formed integral with the yoke 352 and journaled in a boss provided on the gear box cover 348 as clearly seen in Fig. 43. The forward end of shaft 350 and a reduced portion of sleeve 366 are pinned to a knob 367. The gears in the cluster thereof referred to are suitably secured as a unit to a shaft 358 which is rotatably supported in bearings in the gear box and its cover 348 and in the rear portion of bracket 312. It will be observed that pinion 347 passes through the left arm of yoke 352 as viewed in Fig. 43 and is held from sliding endwise on its supporting shaft 350 by the other (right) arm of the yoke and by a familiar type of split ring (or a cotter pin would do) keyed to the shaft adjacent to the left end of the pinion.

Toward the inner end of shaft 358 there is secured a pinion 360 which is constantly in mesh with the horizontal rack 126. Rack 126 lies in a spline formed along the top of the lower rod 169, Figs. 2, 35, 36 and 43 and as shown in Figs. 4 and 33, rack 126 is constantly in mesh with an idler pinion 361. In turn, pinion 361 is rotatable on a fixed stub shaft by a pinion 362, the latter being pinned to the inner end of a rotatable fore and aft shaft 363 carrying at its forward end a pinion 364 which is in constant mesh with the vertical rack 124. Shaft 363 is carried in suitable bearings provided at the left end of the rigid framework 151, see also Fig. 2.

It will now be evident that the leftward advances of the horizontal delivery slide rack 125 by the line follower latched thereto are converted by pinion 144 to corresponding downward advances of the vertical rack 124; that these successive advances are transmitted by pinions 364, 362 and 361 to leftward advances of rack 126 and finally to corresponding downward displacements of rack 127 and the film holder resting thereon through the train of gears 360, 353, 351 and 347.

Assuming the shiftable idler 351 to be placed in mesh with the smallest gear 353, this being the condition illustrated in Fig. 43, the transmission ratio will be 1:1, that is, rack 127 and the film holder will move downward for each successive exposure a distance exactly equal to the body thickness of the then displaced element. By shifting the idler 351 into mesh with the next larger gear 354, the transmission ratio will be 3:1, the 12-point characters on the line elements then being reproduced in 36-point size. And with idler 351 in mesh with the still larger gears 355, 356 or 357, the reproductions will be 4:1 or 48-point, 5:1 or 60-point and 6:1 or 72 point, respectively.

For reproducing the master 12-point size characters in one-half size or 6-point, shaft 363 is provided at its inner end, Fig. 4, with another pinion 365 which is one-third smaller than the one-to-one pinions 361 and 362 and this shift is shiftable endwise to bring this smaller pinion 365 into mesh with an auxiliary idler pinion 366 secured to the rack-moving pinion 361 and one-third larger than the latter pinion. With pinions 365 and 366 in mesh, and with the idler 351 in mesh with gear 353, each advance of rack 127 and the film holder will be one-half the extent of advance of rack 126, that is one-half of the full body thickness of the then displaced line element, thus providing for letter spacing commensurate with the half size or 6-point reproductions.

The one-half reduction pinions 365 and 366 may, of course, be left in mesh if desired while producing enlarged sizes in connection with adjustments of the idler gear 351. In such case and with idler 351 in mesh with the successive gears in the cluster thereof on shaft 358, the letter spacing using gears 354, 355, 356 and 357 will be suited to reproduction ratios of 3:1 or 18-point, 4:1 or 24-point, 5:1 or 30-point and 6:1 or 36-point. It should be pointed out here that if desired the idler gear 351 may be set to provide a driving ratio between racks 126 and 127 that is not in accord with normal letter spacing for the particular point size of the photographic reproductions. Thus, when enlarging to say an 18-point size (using gears 365 and 366) the normal letter spacing for that size would be attained by meshing the idler 351 with gear 354 of the cluster thereof to provide a 3:1 driving ratio. However, gear 355 may be used instead so as to letter space the 18-point size reproductions according to a 4:1 ratio as is normal for 24-point size letters, the purpose being to extend or stretch the over-all length of the reproduced line in order to fill out a desired width of space as may be desired to give emphasis or balance in an advertisement.

As seen in Figs. 2 and 4, a lever 373 is provided for shifting the shaft 363 fore and aft to bring the desired gear 362 or 365 into mesh with its corresponding idler gear. The inner forked end of lever 373 engages a collar secured to shaft 363 to effect endwise shifting of the latter and in either endwise position a ball detent and annular groove in the shaft, generally designated 374, retains the shaft against displacement. It will also be observed that the pinion 364 is wide enough to retain mesh with the rack 124 at either shifted position of shaft 363.

Adjustment of the idler gear 351 is accomplished by means of the knob 367 fastened to sleeve 368 to end shaft 360. Thus, there is secured to a flange 369, projecting forwardly from the cover 348 a plate 369a. This plate is provided with a stepped series of five locating notches 370 for accommodating an outwardly bent arm of a finger latch 371, see Fig. 36, this latch being pivotally carried on a radial arm 372, Figs. 35 and 36 rigid with the hub of knob 367. For each notch 370 in plate 369a there is provided in the front edge of flange 369 a small hole 370a for receiving a locating pin 370b projecting inwardly from arm 372. Latch 371 and pin 370b together serve to lock and retain the idler 351 in any selected position of adjustment relative to the cluster of companion gears on shaft 358. To shift the idler 351 from one gear of the cluster to another to change the ratio by which rack 126 drives rack 127, latch 371 is rocked enough to disengage it from a notch 370. Next, knob 367 is pulled forwardly to withdraw pin 370b from the particular hole 370a. At the same time, of course, the yoke 352 and idler 351 therein as well as shaft 350 and pinion 347 thereon move forwardly and as soon as pin 370b is clear, the knob together with sleeve 368, shaft 350 and the yoke and idler 351, 352 may be swung counterclockwise to disengage the idler 351 from the gear in the cluster thereof with which it was in mesh. It will be observed that since yoke 352 swings on the same axis as shaft 350, the idler gear 351 simply rolls about pinion 347 without losing mesh therewith. The knob, sleeve and yoke together with shaft 350 and pinion 347 may now be shifted inwardly or outwardly, as required, to align idler 351 with the desired gear in the cluster thereof. Then, upon turning the knob clockwise to mesh gear 351 with the selected gear pin 370b will align with the corresponding hole 370a. The knob may now be pushed inwardly to engage said pin and the finger latch 371 may then be turned into the corresponding notch to complete the locking of the assembly in its new position.

It will be noted that when the idler gear is disengaged from a companion gear in the cluster thereof for the purpose of shifting the idler relative to the cluster, rack 127 and the film holder resting thereon would, in the absence of some preventative, suddenly descend as far as they could, the long pinion 347 constantly in mesh with the rack being free to spin and in turn spin the disengaged idler under the unsupported weight of the film holder. To avoid the jarring and possible disruptive effects of such action, there is provided an automatic stop 420 for supporting and thus blocking movement of rack 127 and the film holder wherever the knob 367 is pulled forwardly preparatory to disengaging the idler gear 351.

Thus, referring to Figs. 35, 43, and 45, the stop 420 is an angular member freely slidable in a slot and boss in the rear wall of the gear box 349 and loosely hinged to an upright gate 421, the latter being rockable on a pin 422 supported in a boss on the bottom wall of the gear box. A spring 423 urges the gate and stop forwardly, or clockwise as viewed in Fig. 45 whereby at the appropriate time to dispose the stop beneath the lower end of rack 127.

In spaced bores through an elongated boss on the inner face of the gear box cover 348 there is slidably mounted a series of five pins 424, one pin for each of the five positions to which idler 351 may be shifted. As best seen in Figs. 35 and 45, the pins 424 are arranged in an arcuate row and are provided each with a fixed ring 425 or the like for stopping in an outward direction against the boss in which the pins slide. When stopped against the boss, the inner ends of the pins align and lie opposite the gate 421 but the pins are progressively shorter around the arc counter-clockwise so that their outer ends, when any pin is pressed inward (as with the longest one here shown), align with the inner edge of the corresponding notch 370 in plate 369.

On the hub of knob 367 there is provided a lug 426 which, when latch 371 is locked in any notch 370, holds the corresponding pin 424 pressed inward against gate 421 and the urge of spring 422. In such position of the pin and gate the bent arm of stop 420 is disposed out of the path of rack 127 as herein shown.

When latch 371 is released and knob 367 pulled forward to clear pin 370b from its hole, recession of lug 426 leaves the particular pin 424 free to be pushed forwardly by the gate 421 as the latter and stop 420 swing forward under the urge of spring 423. Such forward swing is stopped by ring 425 on the active pin 424 and simultaneous engagement of the gate with the aligned inner ends of all five of the pins. In such position of the gate it will be apparent that the bent arm of stop 420 will be disposed beneath the lower end of rack 127 whereby the latter and the film holder are supported and thus blocked from descending. When rack 127 is so supported it holds pinion 347 from rotation as the idler gear 351 rolls about this pinion upon turning knob 367 to disengage the idler prior to shifting it.

It will be evident, of course, that since the long pinion 347 cannot slide endwise on its shaft 350, it merely slides relative to rack 127 as the idler, shaft and long pinion are shifted in or out as the case may be in selecting a different ratio driving gear in the gear cluster.

Upon pushing knob 367 inward to enter pin 370b in the hole 370 appropriate to the new engaged position of the idler gear the pin 424 then aligned with lug 426 will be pressed inwardly thereby and in turn swing the gate and stop 420 rearwardly, thereby moving the stop out of the path of rack 127.

When the film holder is adjusted relative to the photographing position for enlarging or reducing, the lens holder 180 must also be adjusted to provide proper focusing conditions. Thus, referring to Figs. 2 and 42, the lens holder is supported on horizontal upper and lower toothed rods 375, these rods being suitably secured as by screws to the arms 251 of bracket 249. Upper and lower shafts 376 which are rotatable in bores through the holder 180 carry pinions 377 meshing with the corresponding toothed rods 375 and also carry bevel gears 378 which mesh with similar pinions secured to a vertical shaft 379 supported for rotation in the holder 180. By turning a knob 380 on a shaft suitably geared to the lower shaft 376, see Fig. 2, the holder 180 may be adjusted along the rods 375 to desired positions indicated on the scale bar 381. The holder 180 is also provided with a suitable well known form of adjustable diaphragm disposed beneath the locking plate 382, the aperture setting of the diaphragm being controlled from its associated pointer 383 and indicated by the scale 363 as seen in Figs. 2 and 42.

Line blank-out devices

As hereinbefore pointed out under the discussion of the photographic shutters, the auxiliary shutter slide 260 serves as a safety for closing aperture 258 if for any reason it should be required to circulate a composed line of elements through the machine without photographing the characters thereof. Thus, if in following his manuscript the operator should inadvertently skip a line or compose a wrong line, or should he underset or overset a line in an effort to arrive at a proper end point in breaking up a word, or if he should make an error which would be too awkward and time-consuming to correct by hand manipulation of the elements in the assembling elevator, the most efficient procedure would be to allow the unwanted line of elements to circulate and distribute without photographing them and meanwhile to compose a new line.

Ordinarily the operator will detect a wrong line or an error too difficult to correct before "sending in" the line, the customary practice being to observe the usual reference characters on the front edges of the respective elements in the composed line thereof as a last minute check for errors prior to raising the assembling elevator. Should an error be overlooked, it will, of course, appear on the film or paper, whichever is used, and require subsequent correction later on as by stripping out the bad line and substituting a corrected one. As to underset and overset lines (commonly called loose and tight lines), the operator is made aware of such conditions through the provision, according to the invention, of a safety switch 384, Figs. 15 and 28, which is controlled by the line justifying device and automatically prevents operation of the element feeding and photographing devices.

For disposing of any unwanted line without recording it photographically, the invention provides a relay, generally designated 385, see especially Figs. 28, 31 and 32, for operating the auxiliary shutter slide 260; a solenoid 386, Figs. 35, 36, for locking the film holder against downward movement as the line of elements is circulated, and a hand switch, generally designated 387 in Figs. 2 and 28, for rendering such relay and solenoid operative when required.

The relay 385 is shown in Figs. 2, 3, 18, 28, 31 and 32 and comprises a coil carried by a bracket 388 secured to plate 252 and having a lug on which is pivoted an armature 389. A spring 390 hooked to the armature and to a hook on the bracket, as best seen in Figs. 18 and 31, urges the armature to open position. By means of a free link 391 the relay armature is connected to a lever 392 pivoted at 393 on plate 252, the forked lower end of this lever engaging over a shoulder screw 294 in the shutter slide 260. Under normal conditions relay 385 is not energized and therefore its armature and the safety shutter 260 connected thereto are held in the open position as seen in Figs. 20, 21 and 23.

The solenoid 386 is suitably secured to the upper cast bracket 310 (see Figs. 35 and 36) and under normal conditions, with no current flowing through it, its plunger 395 is retracted by a light spring and stands clear of an out-turned lip 396 along the upper edge of the back plate 276 of the film holder.

Referring to Fig. 28, relay 385 and solenoid 386 are electrically connected in parallel and in circuit with the normally open contact 397 of the hand switch 387, the other contact 398 of this switch being normally closed and in series circuit with the safety switch 384 which, as stated above, is controlled by the justifying devices. Assuming first the condition that upon checking a line just composed in the assembling elevator 6, Fig. 1, the operator discovers it to be a wrong line or to contain a bad error. To circulate such unwanted line of elements without photographing them, it is only necessary to throw the switch 387 (at the front of the machine in Fig. 2), thus to close the circuit through its contact 397 and energize relay 385 and solenoid 386. As a result, the solenoid plunger 395 is forced outward to locking position under the lip 396 of the film holder (so that the latter will not partake of its usual step-by-step downward movement), and a magnetic field is set up for urging the relay armature 389 to closed position. The armature, however, cannot close immediately since the connected safety shutter 260 is blocked from movement leftward (as viewed in Figs. 31 and 32) until the auxiliary shutter slide 259 is moved open, this latter action taking place in the manner already described, that is, when rocker 261 is operated by the first element displaced upwardly in the feed channel by the chains.

Accordingly, after the operator sets switch 387 for circulating an unwanted composed line of elements, he sends in such line and the main drive of the machine is started through closing of the starting switch 39 and concurrent tripping of the starting relay 29, all as hereinbefore explained. And also as previously explained, upon completion of the first part of the main cam shaft cycle (about 150 degrees) the element displacing chains are started through de-energizing of the solenoid 96 and consequent engagement of the driving clutch 76—77.

As the first displaced element now operates rocker 261 to effect opening of the auxiliary shutter slide 259, the safety shutter 260 which is now subjected to the magnetic urge on the armature of relay 385 follows the leftward or opening movement of shutter slide 259 until lever 392 is stopped by a fixed pin 399 in plate 252. Pin 399 is so located as to stop slide 260 before slide 259 has opened fully, that is, before pin 273 in the latter slide is engaged by the latch 268. The extent of the follow stroke of slide 260 is sufficient however to permit the slide to fully cover aperture 258 and to prevent separation of the overlapping adjacent ends of the two slides 259 and 260. The relative positions of the slides, after their operation when switch 387 is set for blanking out a line, is clearly shown in Fig. 22.

After displacement of the last element of the unwanted line latch 268 is tripped from engagement with the holding pin 273 by the overmotion stroke of register bar 131 in the manner previously explained. Shutter 259 is thus released and is free to move to the right, but for the time being it can move only to the extent that the overlap of the two slides is complete, slide 260 being held in the aperture closing position (against pin 399) by reason of the fact that relay 385 remains energized so long as the contact 397 of switch 387 provides a closed circuit. At this point it should be mentioned that the follow stroke of slide 260 is purposely made less than the full leftward stroke of slide 259, the difference in stroke enabling the latter slide to move in the return direction at least to the extent that pin 273 may escape from latch 268 as soon as the latter is tripped by the overmotion of bar 131 when the last element has passed it. Thus, even after the main drive is started again (as it is when displacement of the last line element allows switch 100, 101 to close) the shutter slides 259, 260 will not return to their normal positions shown in Fig. 20, nor will the film holder be released, these actions occurring only when the operator resets switch 387 whereby to break the circuit through relay 385 and solenoid 386.

According to the arrangement herein disclosed, switch 387 should not be reset until the line delivery slide 105 has completed its return stroke and restored the several racks, including rack 127, to their normal starting positions where they are locked by pawl 123, Fig. 33. The reason for this is that should the film holder be released (through retraction of plunger 395 when switch 387 is reset) before rack 127 has been returned against screw 284, Figs. 35 and 36, the film holder would drop freely and with a jar onto the lowered rack 127, it being remembered that during displacement of the elements of the unwanted line rack 127 partakes of the same step-by-step downward movements as occur in the instance of wanted lines. In this connection it may be pointed out that since the auxiliary shutters provided maintain the aperture 258 closed when circulating an unwanted line, the solenoid 386 may be dispensed with if preferred, thus allowing the film holder to advance as usual in response to the successive step-by-step movements of rack 127. In such case, however, dial 321 should be momentarily set for no line-space feed of the film during return of the holder by rack 127.

The blanking out of an underset line involves the same devices and procedure as just described plus the above-mentioned safety switch 384 which latter, under control of the justification devices, serves to detect and to notify the operator of the underset condition by preventing operation of the element displacing and feeding chains upon completion of the first part of the main cam shaft cycle. Thus, it will be recalled that the drive clutch 76, 77 for the chains is normally held disengaged by the energized solenoid 96; that the closing of switch 102 by the final seating of the elevator bar 40 at the end of the first cycle of the main cam shaft energizes the auxiliary relay 103 and allows its spring contact to open whereupon the circuit through solenoid 96 is broken. When this occurs spring 99 acts to engage the clutch 76, 77 and start the chains. These circuit conditions will be clear from Fig. 28 to which reference should be had in connection with all of the electrical circuits involved.

Assuming now that an underset line of elements is sent in by the operator, the main drive of the machine will start as usual when switch 39 is rocked closed at about the end of the line delivery action. At the end of the first part of the machine cycle, switch 121 will be closed by the full descent of bar 56, and switch 102 will be closed by the final seating of the elevator bar 40 and break the circuit through relay 103 which ordinarily energizes solenoid 96 as aforesaid. Meanwhile, however, the excessively short or loose line has allowed the spaceband driver 44 to partake of an excessive upward rise—beyond the limit of its range for justifying purposes—whereby to close the safety switch 384 (as next to be explained) through which, and the normally closed contact 398 of switch 387, an auxiliary energizing circuit through solenoid 96 is completed somewhat before the normal energizing circuit through the contact of relay 103 is broken.

The construction provided for operating the safety switch 384 will be clear from Figs. 15, 16, 17 and 28 wherein it will be seen that before the justified bar 44 is operated the plunger of switch 384 rests against one of the vertical posts 161 to which the bar 44 is secured whereby the plunger is pressed in to hold the switch contacts closed. When the bar 44 is raised to justify the line a flat depressed area 400 allows the switch plunger to spring outward (due to the springy nature of the switch contacts) and thus open the switch. The flat area 400 is of such extent that the contacts remain open as the driver 44 rises in justifying lines composed reasonably close to the line measure or length for which the confining jaw 119 is set. As well understood, lines are usually composed a trifle short of the exact measure being set—within up to a maximum of two ems gives the operator sufficient latitude for ending or breaking up words—and the lines are then expanded to the exact measure by the justifying spacebands.

Beyond the lower extremity of the flat area 400 is a rise 401 which serves to depress the plunger of switch 384 and thus press the switch contacts closed whenever the driver 44 rises too far, as happens whenever the line is underset and thus too loose to be expanded to the required line measure. Such closing of switch 384 results in completing the auxiliary energizing circuit through the solenoid 96 as mentioned above and preventing engagement of the chain driving clutch 76, 77.

The operator is, of course, immediately aware of this "stalled" condition through failure of the element displacing action to start. In such event, he proceeds to dispose of the defective line by throwing the hand switch 387. This results, as before, in closing the circuit through contact 397 of the hand switch whereby relay 385 and solenoid 386 are energized, and in opening the contact 398 of the hand switch whereby the energizing circuit through solenoid 96 and the closed switch 384 is broken. Clutch 76, 77 immediately engages and due to the now energized relay 385 the shutter slides 259, 260 shift leftward together and close aperture 258 upon tripping of rocker 261 by the first element displaced by the feed chains. Meanwhile the plunger of solenoid 386, which is also energized when the contact 397 of the hand switch is closed, locks the film holder against downward movement while the elements of the defective line are being circulated.

The ensuing actions while the hand switch contact 397 is closed for circulating an underset or loose line are the same as those already described in connection with circulating an unwanted line which the operator discovered by observation. It may be pointed out, however, that the additional safety switch 384 opens as soon as the driver bar 44 starts downward during the second cycle of the main cam shaft, the depressed area 400 allowing the switch plunger to spring out upon leaving the rise 401 and the plunger is again pressed in to close the switch when bar 44 returns to its normal down position. Upon return of rack 127 against screw 284 the hand switch 387 may be reset, as before, to release the film holder from solenoid plunger 395 and to de-energize the shutter operating relay 385.

In the event of a tight line, the circuits and corrective measure (throwing of the hand switch 387 by the operator) are exactly the same as just described for loose lines. The only difference is that since there is no room for expansion of the line the spacebands block bar 44 from rising and the contacts of switch 384 are thus held closed.

Spaceband distributing devices

As pointed out earlier in this specification, each spaceband element arriving at the top of the feed channel 186 is discharged by the pusher 238 on to rails along which they are pushed to a drop-off point for subsequent distribution back to the spaceband storage box G, Fig. 1. The mechanism for effecting distribution of the spacebands is generally similar to that disclosed for the same purpose in the pending application of Klingberg, et al. hereinbefore referred to, certain additions thereto being clear from the ensuing description in connection with Figs. 1, 2, 4, 5 and 6.

As shown, there is secured to the upper end of the vertical feed channel plate 182 a plate 402 provided with counterbores 403, Fig. 4, for accommodating mating gears 404. These gears are secured to the left end, Fig. 1, of similar horizontal and spirally threaded conveyor screws 405, the latter being journaled at this end in plate 402 and at the opposite end in a similar plate 406. A gear 407, Fig. 4, meshing with one of the gears 404 and supported on a shaft in the frame member 19 serves to drive the screws 405, in opposite directions, of course, through the agency of a belt 408, the latter running over a pulley on the usual intermediate shaft 38, Fig. 6, and a pulley adjacent the gear 407. Screws 405 are similar to the well known distributor screws employed on commercial typographical machines for conveying matrices, but in the present instance they serve to convey the spacebands received between their threads when discharged by the pusher 238.

Thus, when a spaceband reaches the discharge position at the top of channel 186, its lower lugs are aligned with opposed shoulders or rails 409 formed on plate 402, see Figs. 2 and 4. As the pusher 238 makes its discharge stroke, the spaceband is advanced along these rails on which it hangs by gravity, the plate 402 having a vertically elongated opening 410, Fig. 4, for the free passage of the depending slide of the spaceband as it is advanced. Rails 409 terminate just before the pusher reaches the end of its discharge stroke whereupon the spaceband drops by gravity to an intermediate position (as distinguished from a direct drop into the retaining screws 405 as in the Klingberg et al. machine) where one of its lower lugs finds support on the hooked end of the depending arm of a bell crank 411, see Fig. 4. A cross strap 412, Fig. 2, serves as a guide to keep the spaceband in a vertical posture as it gravitates off the end of rails 409.

As will be observed from Figs. 1 and 4, the bell crank 411 is suitably secured to one end (the left end in Fig. 1) of a cross rod 413 journaled at opposite ends for rocking motion in suitable bearings in plates 402 and 406. To the other end of rod 413 is secured a lever arm 414 carrying at its lower end a roller 415. For rocking rod 413 there is provided on the adjacent end of the shaft of the front screw 403 a cam lobe 416 to which roller 415 and its lever 414 respond at each turn of the screw. A spring 417 urges the bell crank 411 and thus rod 413 clockwise to keep roller 415 in contact with its cam.

The relative disposition of lobe 416 and roller 415 is such as to actuate the bell crank 411, to release a spaceband from its hooked end, in timed relation to admit the lower lugs of the released spaceband into the opposed threads of the rotating screws 405. Immediately the released spaceband drops by gravity into the screw threads, it is carried or conveyed by the rotating screws along fixed opposed horizontal rails 418 along which the lower spaceband lugs slide during the advancing motion imparted by the screws. The rails 418 extend rightward slightly beyond the starting point of a pair of upper rails 419 which slope downwardly as seen in Fig. 1 so that when the lower lugs of the spacebands leave the threads of screws 405, their upper lugs engage rails 419 and the spacebands are then free to gravitate along the sloping rails 419 to the front or right hand end of the storage box G. The successive discharged spacebands accumulate on the rails 419 of the storage box with the leading one retained as by any suitable form of escapement pawl device (not shown), for example a rocker pawl such as shown in the Klingberg, et al. application. As well understood, such escapement is rocked in response to a key at the usual keyboard to release the spacebands from the box G, one at a time, as needed during the composition of a line.

Since many embodiments might be made of the present invention and since many changes might be made in the embodiment disclosed herein, it is to be understood that the foregoing description is to be interpreted as illustrative only and not in a limiting sense.

We claim.

1. Apparatus for photographically producing on a sensitized surface a line of type matter by photographing individually character-bearing elements composed into a line, in combination, a channel for supporting a composed line of elements, an abutment against which the leading element of said line is adapted to be positioned, element-removing means movable progressively in one direction and including a series of spaced pawls for engaging and moving successive elements singly from the leading end of the line to a photographing position, photographing means, line-follower means movable from a starting position in steps proportioned to the thickness of each element as it is removed, a drive including a clutch, clutch-operating mechanism operative to connect said drive to drive said element-removing and photographing means for a limited period and in timed relation with arrival of the elements for removal and photographing, releasable stop means holding said follower means at a starting position and operative upon release thereof to condition said clutch-operating mechanism to connect said drive, and means operated by said line-follower means in response to the removal of the last element to condition said clutch-operating mechanism to disconnect said drive.

2. Apparatus for photographically producing on a sensitized surface a line of type matter by photographing individually character-bearing elements composed into a line, in combination, a channel for supporting a composed line of elements, an abutment against which the leading element of said line is adapted to be positioned, element-removing means movable progressively in one direction and having a series of spaced pawls for moving successive elements singly from the leading end of the line to a photographing position, photographing means, line-follower means movable in response to each removal of an element, driving means for operating said photographing means, and for operating said element-removing means intermittently with dwells for the photographing operations, releasable means cooperative with said line-follower means to hold said line-follower means at its starting position and operative upon release thereof to initiate the starting of said driving means, and control means operated by movement of the line-follower means in response to the removal of the last element to initiate stopping of said driving means.

3. Apparatus for photographically producing on a sensitized surface a line of type matter by photographing individually character-bearing elements composed into a line, in combination, a channel for supporting a composed line of elements, an abutment against which the leading element of said line may be positioned, element-removing means movable progressively in one direction including a series of spaced pawls for engaging and moving successive elements singly from the leading end of the line to photographing and discharging positions respectively, photographing and discharging means, receiving means movable to and from a position for receiving the discharged elements, line-follower means movable from a starting position in steps in response to each removal of an element, driving means for operating said photographing and discharging means and said element-removing means intermittently and in timed relation for the photographing and discharging operations, releasable means holding said line-follower means at its starting position and operative simultaneously to release said line-follower means and to initiate starting of said driving means, and control means jointly responsive to movements of said line-follower means and said receiving means to stop the operation of said driving means.

4. Apparatus for photographically producing on a sensitized surface a line of type matter by photographing individually character-bearing elements composed into a line, in combination, a guideway, a channel for supporting a composed line of elements for movement bodily endwise toward said guideway, means movable in one direction only along said guideway including a series of uniformly spaced pawls for engaging and removing successive leading elements singly edgewise from the line and for holding said elements momentarily at a photographing position along said guideway, photographing means, a line-follower operative simultaneously to advance the sensitized surface and the remaining elements after each removal of an element until all of said elements are presented for removal, a drive for operating said photographing means and for operating said element-removing means with dwells in timed relation for the photographing operations, a releasable stop normally holding the line-follower at a starting position, start and stop controls for said drive including a start control responsive to movement of said releasable stop from its holding position to condition the drive for starting, a stop control responsive to movement of the line-follower after removal of the last line element to condition said drive for stopping, and a control common to and cooperative with each of the aforesaid controls for connecting and disconnecting said drive when so conditioned.

5. A combination as set forth in claim 4, including movable line-justifying means, said line-justifying means being operative only between limits located within a total range of movement to justify the composed line of elements, and wherein the start control for the drive includes an element operated by said line-justifying means when outside said limits to prevent the drive from starting.

6. Apparatus for photographically producing on a sensitized surface a line of type matter by photographing individually character-bearing elements composed into a line, in combination, a channel for supporting a composed line of elements, a guideway against which the leading element of said line may be positioned, element removing means movable intermittently and progressively in one direction including a series of uniformly spaced pawls adapted to engage and move successive elements singly from the leading end of the line and to present them momentarily at rest at photographing and discharging positions respectively along said guideway, element photographing, discharging and receiving means, said latter means being movable to a receiving position to receive elements from said discharging position, and movable from said receiving position after receiving said elements, line-follower means movable from a starting position and operative upon each removal of an element to advance the remaining elements to present the successive elements for removal, a releasable stop cooperative with said line-follower means at its starting position, a drive for driving said element removing, photographing and discharging means including start and stop controls, said controls being responsive jointly to movement of the element-receiving means into receiving position and of said releasable stop to releasing position to start said drive, and being responsive jointly to advance of the line-follower means after removal of the last removed element and movement of said receiving means from receiving position subsequent to advance of the line-follower after removal of the last element to stop the drive.

7. In apparatus for photographically producing on a sensitized surface a line of type matter by photographing character-bearing elements composed into a line, in combination, a guideway, a channel for supporting a composed line of elements for movement bodily endwise therein toward said guideway, means including uniformly spaced element-engaging members movable progressively in one direction along said guideway for engaging and removing the elements singly and successively from the composed line and for advancing them to photographing and discharging positions, element photographing, discharging and receiving means, means operative to move the latter means to and from a receiving position for receiving the discharged elements, driving means for operating the element removing, photographing and discharging means and including dwells for stopping the elements at the photographing and discharging positions, a control system relating starting of said driving means with the movement of the element receiving means into receiving position, and relating stopping of said driving means to the removal of the last line element and to the movement of said receiving means from said receiving position subsequent to the removal of the last line element.

8. In apparatus for photographically producing on a sensitized surface a line of type matter by photographing character-bearing elements composed into a line, in combination, a channel for supporting a composed line of elements and an adjacent channel extending laterally thereto, movable means for removing the elements singly from the composed line and for advancing them edgewise in spaced relation along said lateral channel progressively to photographing and discharging positions, photographing means, element discharging means and a receiver movable to and from a receiving position for receiving the elements discharged thereto, line-advancing means movable to move the composed line of elements bodily endwise to present the first and thereafter each successive element to said lateral channel for removal and simultaneously to move said sensitized surface, releasable means normally holding said line-advancing means at a starting position, driving means for driving said element removing means with dwells for stopping the elements at the photographing and for discharging positions and driving the photographing and discharging means in timed relation with said dwells, and control means for controlling said driving means, said control means being conjointly responsive to movement of said releasable means to release said line advancing means to condition the driving means to start, and movement of said receiver into element receiving position to actually start the driving means, and conjointly responsive to movement of the line-advancing means after removal of the last line element to condition the driving means to stop, and to movement of the receiver from element-receiving position to actually stop the drive.

9. In apparatus for photographically producing on a sensitized surface a line of type matter justified to a desired length by photographing character-bearing elements composed into a line, in combination, a guideway, a channel for supporting the composed line of elements for movement bodily endwise toward said guideway, element-removing means movable along said guideway for engaging and removing the elements singly from the end of the line at said guideway and advancing them to a photographing position, means for photographing each element at said position while engaged by said removing means, a line-follower movable in steps in response to each removal of an element from the composed line of elements, movement of said line-follower controlling movement of said sensitized surface, a releasable stop normally holding the line-follower and sensitized surface at starting positions, means for justifying the line between said guideway and said line-follower, while the latter is held by said releasable stop, driving means for said element-removing means including a clutch, control means responsive to the position of the justifying means and to movement of said releasable stop to release said line-follower to effect engagement of said clutch, and control means operated by movement of the line-follower after removal of the last line element to initiate disengagement of said clutch.

10. In apparatus for photographically producing on a sensitized surface a line of type matter by photographing individually character-bearing elements composed into a line with spacer elements, said elements having body thicknesses proportioned to the setwise widths of characters and spaces represented thereby, in combination, a horizontal channel for supporting a composed line of such elements and a guideway at one end of said horizontal channel and providing a path extending therefrom to a photographing position, line-moving means movable from a starting position and operative to move the composed line of elements bodily endwise into and along the horizontal channel to said guideway, a line-length determining member adjustable relative to said guideway and means for moving said member vertically from an inactive starting position into the path of movement of the line-moving means to temporarily engage and hold said latter means at the determined line-length position, justifying means movable from an inactive starting position and operative to expand the spacer elements to justify the composed line of elements in the space between the guideway and said engaged member, element-removing means normally inoperative and driving means for moving it along said path, said removing means operating to engage and move the elements one-by-one from a position against said guideway to the photographing position, means operative after the spacer expanding operation of the justifying means to move the line-length determining member to a position to release the line-moving means whereby the latter may urge the composed line of elements toward said guideway and means responsive to the line-length determining member when moved to such position to start the element-removing means in operation, and means operative under control of the line-moving means after removal of the last line element to stop the operation of said removing means and to start in operation means for returning the line-moving means, the justifying means and the line-length determining member to their starting positions.

11. In apparatus for photographically producing on a sensitized surface a line of type matter by photographing individually character-bearing elements composed into a line, in combination, a channel for supporting a composed line of elements and a cross channel providing a path for movement therealong of the elements individually, line-moving means and element-removing means operative conjointly to feed successive elements from one end of the line along said path progressively from a removal position at the intersection of said channels to photographing and discharging positions, photographic shutter means and element-discharging means, a Geneva drive for driving the element-removing means intermittently in one direction with dwells for the photographing and discharging operations and a second drive synchronized with said Geneva drive for continuously operating said shutter and discharging means in timed relation with such dwells, means for releasing the line-moving means to move said composed line of elements and for simultaneously starting in operation said Geneva and second drives to effect the successive removal, photographing and discharging of the elements, means actuated by movement of the line-moving means after removal of the last removed element to effect stopping of said drives, and means independent of the element-removing means for holding each leading line element at the removal position in said cross channel until the Geneva drive is started and also during the period between the successive dwells in the operation of said Geneva drive.

12. Apparatus for photographically producing on a sensitized surface a column of lines of type matter by photographing individually character-bearing elements of successively composed lines thereof, in combination, a channel for supporting a composed line of elements, element-moving means for successively removing the leading elements from one end of such line to a photographing position, line-follower means movable in response to each removal of an element to advance with the line along said channel, photographing means including a fixed optical axis and a holder for the sensitized surface, said holder being advanceable from a starting position by steps under control of the movements of said line-follower means to present to said axis aligned fresh portions of the sensitized surface for receiving in line the successive photographic impressions, a member moved by the line-follower means and operatively connected thereto for correlating the line-starting and line-ending positions of said line-follower means and said holder, mechanical means operative to return the holder and line-follower means to their starting positions, a device actuated by the line-follower means for setting said mechanical means in operation subsequent to the removal of the last element from the line, and line-spacing mechanism for advancing the sensitized surface columnwise a predetermined desired amount, said line-spacing mechanism comprising feed rolls, an adjustable member adjustable to select the line spacing desired, and a driving element cooperative therewith including a slip-clutch operative during the return of the holder to its starting position to effect engagement of said element with said feed rolls, the stroke of said element being regulated by the setting of said adjustable member and being moved reversely by said member to the same extent while said clutch is engaged and the holder is returning from its line-ending position to its line-starting position.

13. Apparatus for photographically producing on a sensitized surface a column of lines of type matter by photographing individually character-bearing elements of successively composed lines thereof, in combination, a channel for supporting a composed line of elements, element-moving means movable across one end of said channel and operating to engage and move successive elements from the end of the line to a photographing position, line-follower means movable from a predetermined position in amounts proportioned to the thickness of each removed element, photographing means including a holder for the sensitized surface advanceable from a starting position under control of the movements of the line-follower means to present fresh portions of said surface for receiving in line the photographic impressions of the elements successively presented at the photographing position, returning means operative to return said line-follower means and holder to said starting positions for the next line after the photographing of the last element of the preceding line, and line-spacing means for advancing the sensitized surface columnwise, said spacing means comprising a stroke-adjusting member adjustable to determine the extent of line-spacing movement of said surface, feed rolls and a rack movably mounted on the holder for driving said rolls, said rack being urged from a starting position by a spring into engagement with said stroke-adjusting member as the holder advances, the amount of movement of said rack being determined by said member, and being returned to its starting position as said holder is returned to its starting position, and a slip-clutch drivingly connecting said rack and feed rolls only during the return movement of said holder and rack.

14. Apparatus for photographically producing on a sensitized surface a column of lines of type matter by photographing individually character-bearing elements of successively composed lines of such elements, in combination, a channel for supporting a composed line of elements, element-removing means operative to remove successive leading elements individually from one end of said line to a photographing position, line-follower means movable from a starting position in response to the removal of each element from the line, photographing means including an optical axis and a movable holder for the sensitized surface movable relative to said optical axis from a starting position in response to each movement of the line-follower means as the successive elements are removed from the composed line whereby to align with the optical axis adjacent fresh portions of the sensitized surface for receiving the successive photographic exposures, mechanism for returning the line-follower means and holder to their respective starting positions for the next line after exposure of the last element of each composed line, and line-spacing mechanism for advancing the sensitized surface columnwise a predetermined amount during the return movement of the holder, said mechanism including an adjustable member adjustable to select the line spacing desired and an element carried by the holder and movable relatively to the sensitized surface, said movement being produced by movement of said holder, the amount of movement being controlled by said adjustable members, said element being mechanically connected at the line-ending position of the holder to advance the sensitized surface, and, as the holder is returned from its line-ending position to its starting position, operating to advance said surface to the extent of such relative movement.

15. Apparatus for photographically producing on a sensitized surface successive lines of type matter by photographing character-bearing elements of successive composed lines thereof, in combination, a channel for supporting a composed line of elements, element-removing means for removing successive leading elements from said line to a photographing position, photographing means including lens means and a holder for the sensitized surface movable with respect to said lens means to present fresh areas of the sensitized surface for photographic impressions, line-follower means movable from a starting position in response to the removal of each element from a composed line and controlling the movement of said holder, means for adjusting said lens means relatively to the photographing position to produce on adjacent fresh areas of the sensitized surface images of the same or of enlarged or reduced sizes, as desired, a movable member engaging said holder, and thereby producing movement thereof corresponding to movement of the movable member and correlating the line-starting and line-ending positions of the holder and line-follower means and accordingly the relative positions of the images produced in line on the sensitized surface, adjustable ratio driving mechanism between said movable member and line-follower means for moving said movable member in amounts adjustably proportioned to given movements of the line-follower means to produce responsive movements of the holder in conformity with the enlargement or reduction in size of the produced images, means responsive to movement of the line-follower means after removal of the last element from the line to return said line-follower means, said movable member, and holder to their respective starting positions for the next line; and line-spacing mechanism for selectively advancing the sensitized surface columnwise a predetermined amount after each line is photographed, said mechanism including a stroke-adjusting member adjustable to select the line-spacing desired, a movable element carried by the holder and moved during the advancing movement of the holder to a position relative to the sensitized surface determined by the setting of said stroke-adjusting member, said element advancing said surface in accordance with said position during the return movement of the holder.

16. Apparatus for photographically producing on a sensitized surface a line of type matter by photographing character-bearing elements composed into a line, in combination, a channel for supporting a composed line of elements, element-removing means for removing successive leading elements individually from the line to a photographing position, photographing means including lens means and a movable holder for the sensitized surface, line-follower means movable from a starting position in response to each removed element, said holder being movable in response to the movements of the line-follower means for each removal of an element, means for adjusting said lens means to produce on said surface images in enlarged or reduced sizes, as desired, a member driven by the line-follower means and operative to control the time of and extent of each responsive movement of the holder for receiving the successive photographic images on said sensitized surface, selective ratio driving connections between said member and the line-follower means for selecting the amount of the successive movements of the holder in correspondence with the size of the images produced, said connections including a driving element constantly coupled to said member, a releasable coupling for adjusting the ratio of the driving connection between said driving element and the line-follower means, and devices responsive to said releasable coupling for maintaining said element and by it said member and the holder at rest relative to the line-follower means while adjusting said connection.

17. Apparatus for photographically producing on a sensitized surface a line of type matter by photographing character-bearing elements composed into a line, in combination, a channel for supporting the composed line of elements, element-moving means movable across an end of said channel and operative to engage and remove successive leading elements individually from the corresponding end of said line to a photographing position and line-follower means for following the advance of the elements along said channel as the leading elements are removed therefrom, photographing means including a lens and a movable holder for the sensitized surface, a frame supporting said holder for movement in response to each advance of the line-follower means as the successive elements are removed from the composed line of elements, a stop movably mounted on said frame and operatively connected to the line-follower means for movement thereby from a starting position determined by the starting position of said line-follower means before the first element is removed from said line, said stop being operative to determine the extent of the responsive movements of the holder, means for adjusting said supporting frame and with it said stop relative to the photographing position to produce on the sensitized surface a line of images of enlarged or reduced size, means for breaking the operative connection between said stop and the line-follower means during adjustment of the frame and means actuated by said connection-breaking means for locking said stop while said connection is broken, said connection-breaking means being adapted to couple the stop and line-follower means in their relative starting positions in any adjusted position of said frame.

18. Apparatus for photographically producing on a sensitized surface a line of type matter by photographing individually character-bearing elements composed into a line, in combination, a guideway, a channel for supporting a composed line of elements for movement bodily endwise to said guideway, intermittently movable element-moving means operative to engage and remove the elements successively edgewise from the end of the line adjacent to said guideway and operative to present each element momentarily first at rest for exposure at a photographing position and second at rest for discharge at a discharging position along said guideway, photographing means having an optical axis passing through said photographing position, said photographing means including a rotary shutter having an aperture positioned to come periodically into registry with said optical axis as said shutter is rotated and a source of light at said axis, said photographing position being located between said shutter and light source, driving means constructed and arranged to rotate said rotary shutter continuously and to drive the element-moving means intermittently with dwells in timed relation with movement of the shutter aperture past the optical axis, safety shutter means for closing the optical axis in the absence of an element at the photographing position and movable by the first removed element to axis opening position, element-detecting means responsive to the presence of an element at the photographing position to maintain said safety shutter open, a blank-out shutter movable at will from an axis opening position into cooperative relation with the safety shutter and across the optical axis to close said axis after said safety shutter opens whereby to prevent the exposure of a line of elements when desired, and means actuated by movement of said element-detecting means upon the absence of an element at the photographing position to close the safety shutter and to open said blank-out shutter.

19. Apparatus for photographically producing on a sensitized surface a line of type matter by photographing individually character-bearing elements composed into a line, in combination, means for holding a composed line of elements, element-engaging and removing means movable transversely across one end of said line-holding means and operating to move the elements successively from said end of the composed line of elements progressively to photographing and discharging positions, a line-follower movable in response to each removal of an element, a releasable stop for holding said line-follower at a starting position, photographing means having an optical axis passing through said photographing position, said photographing means including a rotary shutter having an aperture positioned to come periodically into registry with said optical axis as said shutter is rotated and a source of light at said axis, said photographing position being located between said shutter and light source, a member movable into engagement with each element at the photographing position for accurately aligning the successive elements on the optical axis, driving means for driving said aligning member, said rotary shutter and the element-removing means in timed relation and including dwells for the successive aligning and photographing operations, a control device responsive to release of the line follower by the releasable stop to start said driving means, and a control device responsive to the advance of the line-follower upon removal of the last line element of the line to stop the driving means.

20. Apparatus for photographically producing on a sensitized surface a line of type matter by photographing individually character-bearing elements composed into a line, in combination, a channel for holding a composed line of elements, a transverse end wall against which the leading element of said line can be positioned, element-removing means movable along said end wall and operative to engage and remove successive leading elements from the end of said line and to present them progressively at photographing and discharging positions, means discharging the elements upon arrival at the discharging position, driving means for driving the element-removing means and discharging means in timed relation, a line-follower movable in response to each removal of an element from a composed line, photographing means including an optical axis at said photographing position and an apertured rotary shutter driven by said driving means, the crossing of the optical axis by the shutter aperture being timed with the presentation of an element at the photographing position, a member for aligning each element at said axis, and actuating means operated by said driving means for moving said aligning member to and from engagement with the successive elements to effect such alignment, a movable sensitized surface movable under control of the successive movements of the line-follower to present fresh areas of said surface for receiving the successive photographic exposures in line, safety shutter means for closing the optical axis when said aligning member operates without an element in the photographing position, said safety shutter means including a shutter moving member movable against the tension of a spring by the first element moved into photographing position to open the safety shutter means and including also a latch for holding said shutter means open, said latch being movable by movement of said aligning member in the absence of an element at the photographing position to release said shutter means and permit said spring tension to close the safety shutter means, a blank-out shutter arranged for movement into a position of engagement with the safety shutter when the latter is open and adapted in such position to close the optical axis to prevent the exposure of a line of elements, when desired, locking means responsive to movement of said blank-out shutter to axis closing position to engage and lock the sensitized surface against movement as the line-follower advances during the element removing operations, and operating means including a manually settable control governing the actions of said blank-out shutter and said locking means, said operating means in one setting of said control operating to move the blank-out shutter to axis closing position as said locking means moves into locking engagement with the sensitized surface and to hold the blank-out shutter and safety shutter means against movement when the latch is tripped by movement of the element-aligning member when no element is present at the photographing position after movement of the last line element from the photographing position, and in another setting of said control operating to effect release of said locking means and release of the blank-out shutter and safety shutter means for movement together, in engaged relation, to their axis opening and axis closing positions, respectively.

21. Apparatus for photographically producing on a sensitized surface a line of type matter by photographing individually character-bearing elements composed into a line, in combination, a channel for supporting a composed line of elements, element-moving means movable in one direction across one end of said channel and operative to positively engage and remove each successive leading element from the end of said line along a path progressively to photographing and discharging positions, a line-follower movable in response to each removal of an element, photographing means including a lens, a movable holder for the sensitized surface, said holder and lens being adjustable relative to the photographing position for producing on said surface photographic impressions the same size or larger or smaller than the size of the characters on the elements, connecting means operatively connecting said holder and line-follower to move said holder as said line-follower moves to present fresh portions of the sensitized surface thereby to produce the successive photographic impressions in line, said connecting means including adjustable motion transmitting members constructed and arranged to change the ratio of movement between the holder and line-follower in accordance with the size of the photographic impressions being produced, and locking means for holding said holder and the line-follower stationary while adjusting said motion-transmitting members, said locking means comprising devices movable into and out of locking position in response to relative movement between the motion transmitting members during their adjustment.

22. Apparatus for photographically producing on a sensitized surface a line of type matter by photographing individually character-bearing elements composed into a line, in combination, a channel for supporting a composed line of elements, intermittently movable element-removing means including driving means for successively moving each leading element from said line to a photographing position and holding each such element momentarily at rest at said photographing position, a line-follower movable in response to each removal of an element from said line, photographing means including lens means and a movable holder for holding the sensitized surface, said lens means being adjustable to produce on said surface characters of the same size as the characters on said elements or of enlarged or reduced size, a movable member mechanically connected to and movable by the line-follower and providing a support for fixing the line-starting position of the holder relative to the starting position of said line-follower and for moving said holder in proportion to movement of said line-follower to space the successive images in line on the sensitized surface, the mechanical connection between the line-follower and said movable member being adjustable to change the ratio of the movement of the movable member and holder produced by a given movement of said line-follower in accordance with the magnification of the type to be produced, manual means for disengaging said mechanical connection to effect the adjustment, and locking means movable, in response to such disengagement, to lock said movable member, holder, and line-follower in their relative positions during adjustment of said mechanical connection.

23. A combination as set forth in claim 22, wherein the specified mechanical connection between the line-follower and the movable member comprises a set of motion transmitting gears providing a plurality of predetermined ratios, and including independently adjustable gearing between the line-follower and said movable member for halving the ratios of movement provided by said motion transmitting gears.

24. A combination as set forth in claim 22, wherein the movable member connected to the line-follower comprises a vertically disposed post on which the holder for the sensitized surface freely rests, and wherein the manual means specified for adjusting the mechanical connection between the line-follower and said post operates, upon disengaging the mechanical connection, to effect engagement of the specified locking means with said post and operates, upon re-engaging the mechanical connections, to release said locking means to permit movement of said post and the holder resting thereon in response to the advances of the line-follower.

25. A combination as set forth in claim 22, wherein the movable member connected to the line-follower comprises a vertically disposed toothed rack on which the holder for the sensitized surface freely rests, and wherein the adjustable mechanical connection specified is arranged between the line-follower and said rack and includes a cluster of different size gears driven as a unit by said line-follower, an idler gear movable to mesh with any one of said cluster of gears by radial and sliding movement while maintaining a meshing engagement with said rack, and means associated with the specified manual means retaining said idler gear in its different positions of adjustment.

26. Apparatus for photographically producing on a sensitized surface a line of type matter by photographing individually character-bearing elements composed into a line, in combination, a guideway, a channel for holding a composed line of elements with the leading element against said guideway, element-moving means for removing successive leading elements from said line and operative to present the elements progressively at photographing and discharging positions along said guideway, a line-follower movable in response to each removal of an element, photographing means having an optical axis passing through said photographing position and including an apertured rotary shutter, an aligning member engaging each element upon arrival at the photographing position to align said element with respect to said optical axis for photographic exposure and means for moving said aligning member to and from engagement with the successive elements to effect such alignment, a sensitized surface movable under control of the successive movements of the line-follower to present fresh areas of said surface for receiving the successive photographic exposures in line, a safety shutter, an operating member actuated by movement of the first element of the line to the photographing position to open the safety shutter, a latch holding said safety shutter in its open position, said latch and said operating member being tripped by movement of said aligning member when no element is present at the photographing position to release said safety shutter to cause it to close, a blank-out shutter movable to close the optical axis when the safety shutter is open and to retain said safety shutter open and said axis closed in spite of tripping of said latch, and mechanism manually set to cause the blank-out shutter to follow the axis opening and the axis closing movements of the safety shutter thereby to maintain the optical axis closed, and the sensitized surface unexposed during operation of the element-moving, photographing and discharging means in respect to a line of elements, said latter mechanism including a member holding the sensitized surface stationary during said element-moving, photographing and discharging operations.

27. A combination as set forth in claim 22, wherein the locking means specified comprises a retaining element urged by a spring into co-operative relation with the movable member supporting the holder, and includes also one actuating member for said retaining element for each position of adjustment of the specified mechanical connection, said actuating members operating in response to each setting of the manual means for said mechanical connection to hold said retaining element against the urge of its spring in an inactive position.

28. In a machine of the kind described for photographically producing on sensitized material successive lines of type matter by photographing successively and individually the characters to be produced to form the respective lines, a movable holder for the sensitized material, said holder having a body portion and having supply and receiving cases mounted thereon at opposite sides thereof containing, respectively, a supply roll of the sensitized material and the portion of such material which has been exposed in the production of the lines of type matter, a fixed guide partially supporting the holder, a movable support for advancing the holder along said guide step-by-step edgewise from a line-starting position to present fresh areas of the sensitized material to receive the successive photographic impressions of the characters of each line, means including said movable support for returning the holder to its starting position after making each line of impressions, line-spacing means for advancing the sensitized material endwise to present fresh areas thereof for receiving the impressions of the successive lines after a line of elements has been photographed, said line-spacing means comprising feed rolls on the holder and adjustable means controlling the amount that said rolls are actuated to effect the advance of the sensitized material, and signal means for indicating exhaustion of the supply of sensitized material, said signal means comprising switch contact fingers yieldingly urged to circuit-closing position and between which the sensitized material is led in its path from the supply to the receiving cases on the holder, said fingers in the absence of the material between them contacting to close the circuit and actuate said signal means.

29. In a machine of the kind described and in accordance with claim 28, wherein manually releasable clamping means on the body portion of the holder separately and detachably secures thereto the supply and receiving cases for the sensitized material, and wherein each case is provided with felt-faced light-excluding strips arranged to yield and close the entrance of the case in response to release of said releasable clamping means.

30. In a machine of the class described in which character-bearing elements are manually released from a storage station to form composed lines of elements and are thereafter passed through successive operatively related mechanisms to photographically produce justified lines of type matter from the composed lines of elements, in combination; a structural framework having secured thereto in orderly assembled relation element storage, composing, justifying and distributing mechanisms, said justifying mechanism including a justifying channel constructed to support a composed line of elements and having an outlet end; a housing, element photographing and element feeding mechanisms mounted therein, said housing having receiving and discharging openings respectively operative to receive in succession single elements from the outlet end of the justifying channel and to discharge in succession single elements to the distributing mechanism, said element-feeding mechanism adapted to move the elements from the receiving opening to a photographing position and thence to said discharging opening, means detachably securing said housing to said structural framework, and adjusting means independent of said latter means for supporting said housing on said framework and for adjusting the housing relative to said framework to accurately align the openings therein with the outlet end of said justifying channel and with said distributing mechanism.

31. A combination as set forth in claim 30, wherein the means for detachably securing the housing to the structural framework of the machine comprises members on which said housing is supported, and means for focally adjusting said housing with respect to said framework, said housing and its adjusting means being adapted for removal as a unit from the structural framework of the machine.

32. A combination as set forth in claim 30, wherein the means for detachably securing the housing to the structural framework of the machine comprises members on which a slide supporting the sensitized medium of the photographing mechanism for letter-by-letter movement relative to an optical axis is mounted, and devices for focal adjustment of said supporting slide, said members and said supporting slide being constructed and arranged with respect to each other for removal as a unit independently of said housing, from the structural framework of the machine.

33. In a machine of the kind described wherein photographable type-bearing elements composed into lines are removed therefrom individually and successively and circulated through a photographing position to reproduce their characters on a sensitized surface, in combination; a holder for the sensitized surface, said holder having a body portion provided at its opposite sides with means detachably securing thereto cases containing, respectively, a supply of the sensitized material and the portion thereof which has been exposed for production of the lines of type matter, means for advancing the holder step-by-step edgewise for receiving the successive photographic impressions to form a line thereof across the sensitized surface, means for returning the holder upon completion of a line of impressions, line-spacing means for advancing the sensitized material endwise in its holder for spacing the successive lines of impressions, and signal means including devices mounted within the holder and operating solely under control of the sensitized material to signal when the end of said material in its endwise advance reaches substantially the point in the holder at which the supply case is attached thereto.

34. Apparatus for photographically producing on a sensitized surface a line of type matter by photographing individually character-bearing elements composed into a line, in combination, a channel for supporting a composed line of elements with the leading element at a guideway, element-removing means moving successive leading elements singly from the composed line progressively to photographing and discharging positions along said guideway, photographing and discharging means, driving means driving said photographing, discharging and element-removing means in timed relation, first control mechanism constructed and arranged to start said drive means in response to delivery of a composed line to said channel, and second control mechanism responsive to removal of the last line element to stop said drive means after a time interval sufficient to permit said drive means to discharge the last line element.

35. Apparatus for photographically producing on a sensitized surface a line of type matter by photographing individually character-bearing elements composed into a line, in combination, a channel for supporting a composed line of elements, a guideway extending transversely from said channel and adapted to receive the leading element of said line, justifying mechanism for justifying a composed line in said channel, element-moving means movable intermittently in the same direction to move the elements singly from the leading end of the line along the guideway to a photographing position, photographing means including a movable sensitized surface and an optical axis, an apertured rotary shutter, driving means for rotating said shutter and intermittently driving the element-moving means in timed relation with the shutter aperture crossing the optical axis, a blank-out shutter movable from a normal position away from the axis to a position across the axis, and mechanism responsive to under-operation or over-operation of said justifying mechanism to move said blank-out shutter to its axis crossing position, and responsive to movement of said justifying mechanism to non-justifying position to restore said blank-out shutter to its normal position.

36. Apparatus for photographically producing on a sensitized surface a line of type matter by photographing individually character-bearing elements composed into a line, in combination, a channel for holding a composed line of elements, a transverse end wall against which the leading element of said line may be positioned, element-removing means movable along said end wall and operative to engage and remove successive leading elements from the end of said line and to present them at a photographing position, driving means for driving the element-removing means, a line-follower movable in response to each removal of an element from a composed line, photographing means including an optical axis at said photographing position and an apertured rotary shutter driven by said driving means, the crossing of the optical axis by the shutter aperture being timed with the presentation of an element at the photographing position, a holder for said sensitized surface movable under control of the successive movements of the line-follower to present fresh areas of said surface for receiving the successive photographic exposures in line, a blank-out shutter arranged for movement into a position to close the optical axis to prevent the exposure of a line of elements, and mechanism operating said blank-out shutter and operative to engage and lock the sensitized surface against movement as the line-follower advances during the element-removing operations when said blank-out shutter is in axis-closing position.

37. Apparatus for photographically producing on a sensitized surface a line of type matter by photographing individually character-bearing elements composed into a line, in combination, a channel for supporting a composed line of elements, element-moving means movable in one direction across one end of said channel and operative to positively engage and move each successive leading element from the end of said line along a path to a photographing position, a line-follower movable in response to each removal of an element, photographing means including lens means, a movable holder for the sensitized surface, said lens means being adjustable to produce on said surface photographic impressions the same size or larger or smaller than the size of the characters borne by the elements, connecting means operatively connecting said holder and line-follower to move said holder as said line-follower moves to present a fresh portion of the sensitized surface for each successive photographic impression, said connecting means including adjustable motion-transmitting members constructed and arranged to change the ratio of movement between the holder and line-follower in accordance with the size of the photographic impressions being produced, locking means for holding said holder stationary while adjusting said motion-transmitting members, said locking means including a device movable into and out of locking position in response to relative movement between the motion-transmitting members during their adjustment.

HERMAN R. FREUND.
FRITZ STADELMANN.

REFERENCES CITED

The following references are of record in the file of this patent:

UNITED STATES PATENTS

| Number | Name | Date |
|---|---|---|
| 1,344,896 | Jobke | June 29, 1920 |
| 2,220,474 | Bryce | Nov. 5, 1940 |
| 2,231,924 | Koller | Feb. 18, 1941 |
| 2,391,021 | Klingberg et al. | Dec. 18, 1945 |